US012354425B2

(12) United States Patent
Akutsu et al.

(10) Patent No.: US 12,354,425 B2
(45) Date of Patent: Jul. 8, 2025

(54) VISIT ASSISTANCE APPARATUS, VISIT ASSISTANCE METHOD, AND NON-TRANSITORY COMPUTER READABLE MEDIUM STORING PROGRAM

(71) Applicant: NEC Corporation, Tokyo (JP)

(72) Inventors: Tatsuki Akutsu, Tokyo (JP); Akiko Ide, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/802,652

(22) PCT Filed: Mar. 23, 2020

(86) PCT No.: PCT/JP2020/012789
§ 371 (c)(1),
(2) Date: Aug. 26, 2022

(87) PCT Pub. No.: WO2021/191986
PCT Pub. Date: Sep. 30, 2021

(65) Prior Publication Data
US 2023/0095529 A1  Mar. 30, 2023

(51) Int. Cl.
*G07C 9/00* (2020.01)
*B66B 1/52* (2006.01)
(Continued)

(52) U.S. Cl.
CPC .............. *G07C 9/37* (2020.01); *B66B 1/52* (2013.01); *G01C 21/206* (2013.01); *G06V 40/168* (2022.01); *G07C 9/10* (2020.01)

(58) Field of Classification Search
CPC ........ G06Q 10/10; G06Q 20/20; G06Q 20/18; G06Q 20/40145; G06Q 30/06;
(Continued)

(56) References Cited

U.S. PATENT DOCUMENTS 4,633,231 A    12/1986 Kilian
11,100,739 B1 *  8/2021 Mathew ................. G07C 9/257
(Continued)

FOREIGN PATENT DOCUMENTS

CN    109859370 A    6/2019
CN    110415420 A    11/2019
(Continued)

OTHER PUBLICATIONS

International Search Report for PCT Application No. PCT/JP2020/012789, mailed on Jun. 9, 2020.
(Continued)

*Primary Examiner* — Dionne Pendleton

(57) ABSTRACT

A visit assistance apparatus includes: a registration unit configured to register a face image of a visitor and visit assistance information in which identification information of a visitor is associated with identification information of a user to be visited; an authentication control unit configured to cause face authentication to be performed by comparing the face image of the visitor captured by a camera installed in an entry control apparatus that restricts an entry to a floor with the registered face image of the visitor; a specification unit configured to specify, when the face authentication has been successful, identification information of the user based on the visit assistance information, and specify a seat position of the specified user based on floor information; and
(Continued)

a generation unit configured to generate guide information for guiding the visitor to the specified seat position of the user on the floor.

9 Claims, 19 Drawing Sheets

(51) Int. Cl.
  *G01C 21/20* (2006.01)
  *G06V 40/16* (2022.01)
  *G07C 9/10* (2020.01)
  *G07C 9/37* (2020.01)
(58) Field of Classification Search
  CPC ........ G06Q 10/02; G06Q 10/04; G06Q 10/06; G06Q 10/0631; G06Q 10/1091; G06Q 20/045; G06Q 50/10; G06Q 50/26; G06Q 50/40; G06V 40/168; G06V 40/172; G06V 40/174; G06V 40/179; G06V 20/52; G06V 20/59; G06V 10/761; G06V 20/36; G06V 20/593; G06V 40/103; G06V 40/166; G07C 9/00; G07C 9/00563; G07C 9/10; G07C 9/37; G07C 9/00309; G07C 9/00571; G07C 9/00896; G07C 9/257; G07C 2009/00769; G07C 2009/00984; G07C 2209/02; G07C 2209/64; G07C 9/253; G07C 9/27; H04W 12/06; H04W 12/08; H04W 88/02; G01C 21/206; H04N 7/181; H04N 7/186; H04L 63/0861; H04L 67/12; H04B 17/318; G10L 17/00; G08B 21/182; G08B 21/22; G08B 21/24; G07F 17/42; G06N 20/00; G06F 18/217; G06F 21/32; B66B 1/468; B66B 2201/4638; B66B 2201/4646; B66B 2201/4676; B64D 11/00; B60R 25/102; B60R 25/245
  See application file for complete search history.

(56) References Cited

U.S. PATENT DOCUMENTS

| | | | | |
|---|---|---|---|---|
| 2017/0193723 | A1* | 7/2017 | Park | E05B 49/00 |
| 2017/0282373 | A1* | 10/2017 | Kondo | G01L 15/22 |
| 2019/0086212 | A1* | 3/2019 | Koshy | G01C 21/383 |
| 2020/0062541 | A1* | 2/2020 | Vuorenala | B66B 1/468 |
| 2023/0134665 | A1* | 5/2023 | Hirasawa | G06Q 10/06 |
| | | | | 382/115 |

FOREIGN PATENT DOCUMENTS

| | | | |
|---|---|---|---|
| JP | S60-209898 | A | 10/1985 |
| JP | 2002-209270 | A | 7/2002 |
| JP | 2003-044892 | A | 2/2003 |
| JP | 2003-208493 | A | 7/2003 |
| JP | 2005-068899 | A | 3/2005 |
| JP | 2005-316945 | A | 11/2005 |
| JP | 2012178022 | A * | 9/2012 |
| JP | 2014-234637 | A | 12/2014 |
| JP | 2015-207030 | A | 11/2015 |
| JP | 2016-009234 | A | 1/2016 |
| JP | 2016-053864 | A | 4/2016 |
| JP | 2019-101566 | A | 6/2019 |
| JP | 2020003941 | A | 1/2020 |
| WO | 2019163543 | A1 | 8/2019 |

OTHER PUBLICATIONS

JP Office Action for JP Application No. 2022-509795, mailed on Mar. 12, 2024 with English Translation.
U.S. Office Action dated Jun. 11, 2024 in U.S. Appl. No. 17/636,451.
European Search Report issued Mar. 31, 2023 in EPO Application No. 20925387.1.
International Search Report issued Aug. 11, 2020 in PCT Application No. PCT/JP2020/011750.

* cited by examiner

VISIT ASSISTANCE APPARATUS, VISIT ASSISTANCE METHOD, AND NON-TRANSITORY COMPUTER READABLE MEDIUM STORING PROGRAM

This application is a National Stage Entry of PCT/JP2020/012789 filed on Mar. 23, 2020, the contents of all of which are incorporated herein by reference, in their entirety.

TECHNICAL FIELD

The present disclosure relates to a visit assistance apparatus, a visit assistance method, and a non-transitory computer readable medium storing a program.

BACKGROUND ART

Patent Literature 1 discloses a technique regarding a security gate that controls entry and exit by face authentication.

CITATION LIST

Patent Literature

[Patent Literature 1] Japanese Unexamined Patent Application Publication No. 2014-234637

SUMMARY OF INVENTION

Technical Problem

It has been difficult for an external visitor (e.g., a delivery person) who has successfully passed through a security gate in a relative large organization such as a company to specify and reach a seat or desk position in a visit destination (a person who is present in a delivery destination) from among a large number of people who are present in the organization.

The present disclosure has been made in order to solve the aforementioned problem and an aim of the present disclosure is to provide a visit assistance apparatus, a system, a method, and a program capable of guiding a visitor to a position in a visit destination while ensuring the security of the visit destination.

Solution to Problem

A visit assistance apparatus according to a first aspect of the present disclosure includes:
  a registration unit configured to register a face image of a visitor and visit assistance information in which identification information of the visitor is associated with identification information of a user to be visited;
  an authentication control unit configured to cause face authentication to be performed by comparing the face image of the visitor captured by a camera installed in an entry control apparatus that restricts an entry to a floor with the registered face image of the visitor;
  a specification unit configured to specify, when the face authentication has been successfully performed, identification information of the user to be visited based on the visit assistance information, and specify the specified seat position of the user to be visited based on floor information in which the identification information of the user to be visited is associated with a seat position of the user to be visited; and
  a generation unit configured to generate guide information for guiding the visitor to the specified seat position of the user to be visited on the floor.

A visit assistance method according to a second aspect of the present disclosure includes:
  registering a face image of a visitor and visit assistance information in which identification information of the visitor is associated with identification information of a user to be visited;
  causing face authentication to be performed by comparing the face image of the visitor captured by a camera installed in an entry control apparatus that restricts an entry to a floor with the registered face image of the visitor;
  specifying, when the face authentication has been successfully performed, the identification information of the user to be visited based on the visit assistance information, and specifying a seat position of the specified user to be visited based on floor information in which the identification information of the user to be visited is associated with the seat position of the user to be visited; and
  generating guide information for guiding the visitor to the specified seat position of the user to be visited on the floor.

A non-transitory computer readable medium storing a program according to a third aspect of the present disclosure causes a computer to execute the processing of:
  registering a face image of a visitor and visit assistance information in which identification information of the visitor is associated with identification information of a user to be visited;
  causing face authentication to be performed by comparing the face image of the visitor captured by a camera installed in an entry control apparatus that restricts an entry to a floor with the registered face image of the visitor;
  specifying, when the face authentication has been successfully performed, the identification information of the user to be visited based on the visit assistance information, and specifying a seat position of the specified user to be visited based on floor information in which the identification information of the user to be visited is associated with the seat position of the user to be visited; and
  generating guide information for guiding the visitor to the specified seat position of the user to be visited on the floor.

Advantageous Effects of Invention

According to the present disclosure, it is possible to provide a visit assistance apparatus and the like capable of guiding a visitor to a seat position in a visit destination or to an area near the seat position while ensuring the security of the visit destination.

EXAMPLE EMBODIMENT

First Example Embodiment

Hereinafter, with reference to the drawings, example embodiments of the present disclosure will be described.

Figure 1:
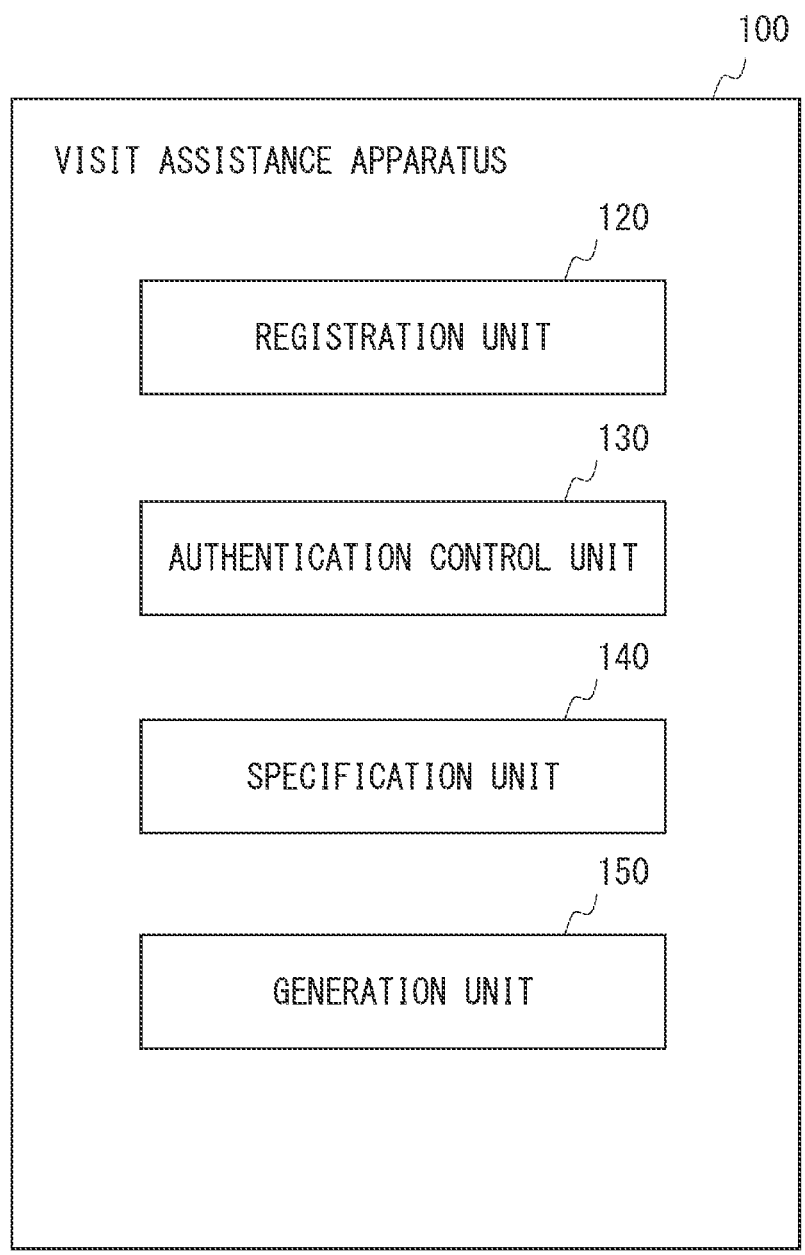
FIG. 1 is a block diagram showing a configuration of a visit assistance apparatus according to a first example embodiment.

FIG. 1 is a block diagram showing a configuration of a visit assistance apparatus according to a first example embodiment.

A visit assistance apparatus 100 according to the first example embodiment includes: a registration unit 120 configured to register a face image of a visitor and visit assistance information in which identification information of the visitor is associated with identification information of a user to be visited; an authentication control unit 130 causing face authentication to be performed by comparing the face image of the visitor captured by a camera installed in an entry control apparatus that restricts an entry to a floor with the registered face image of the visitor; a specification unit 140 configured to specify, when the face authentication has been successfully performed, the identification information of the user to be visited based on the visit assistance information and specify a seat position of the specified user to be visited based on floor information in which the identification information of the user to be visited is associated with the seat position of the user to be visited; and a generation unit 150 configured to generate guide information for guiding the visitor to the specified seat position of the user to be visited on the floor.

Figure 2:
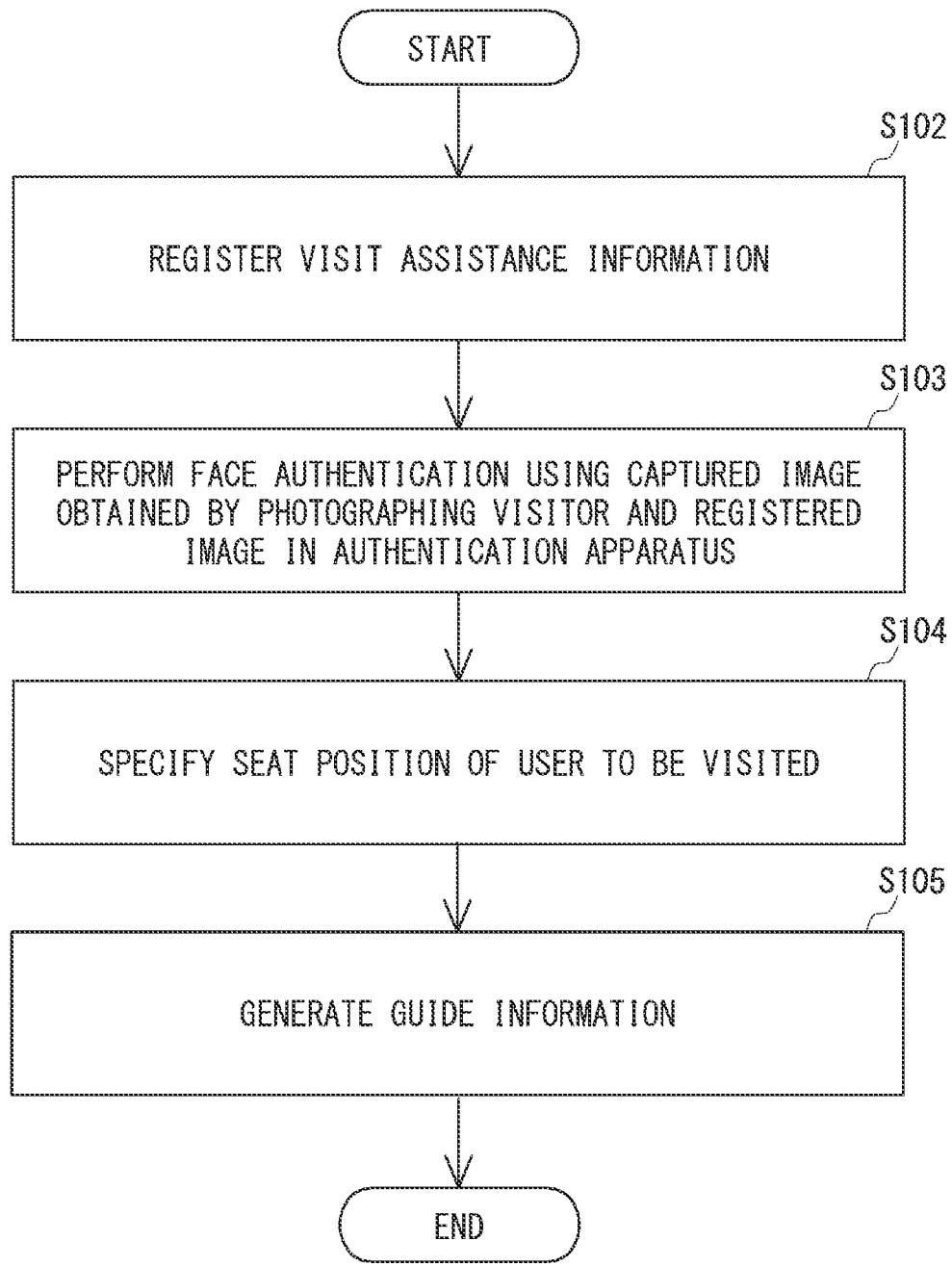
FIG. 2 is a flowchart showing a flow of a visit assistance method according to the first example embodiment.

FIG. 2 is a flowchart showing a flow of a visit assistance method according to the first example embodiment.

First, the face image of the visitor and the visit assistance information in which the identification information of the visitor is associated with the identification information of the user to be visited are registered in the storage unit (Step S102). The storage unit may be provided inside the visit assistance apparatus 100 or outside the visit assistance apparatus 100. Further, the face feature information based on the face image of the visitor may be registered in the authentication apparatus.

A captured image obtained by photographing a visitor by the camera installed in the entry control apparatus that restricts the entry to the floor is acquired, and face authentication is performed by comparing the registered face image with the captured image (Step S103). When the face authentication has been successfully performed, the identification information of the user to be visited is specified based on the visit assistance information and the seat position of the specified user to be visited is specified based on the floor information in which the identification information of the user to be visited is associated with the seat position of the user to be visited (Step S104). Further, guide information for guiding the visitor to the specified seat position of the user to be visited on the floor is generated (Step S105).

According to the first example embodiment described above, it is possible to guide a visitor to a seat position in the visit destination or to an area near the seat position while ensuring the security of the visit destination.

Second Example Embodiment

Figure 3:
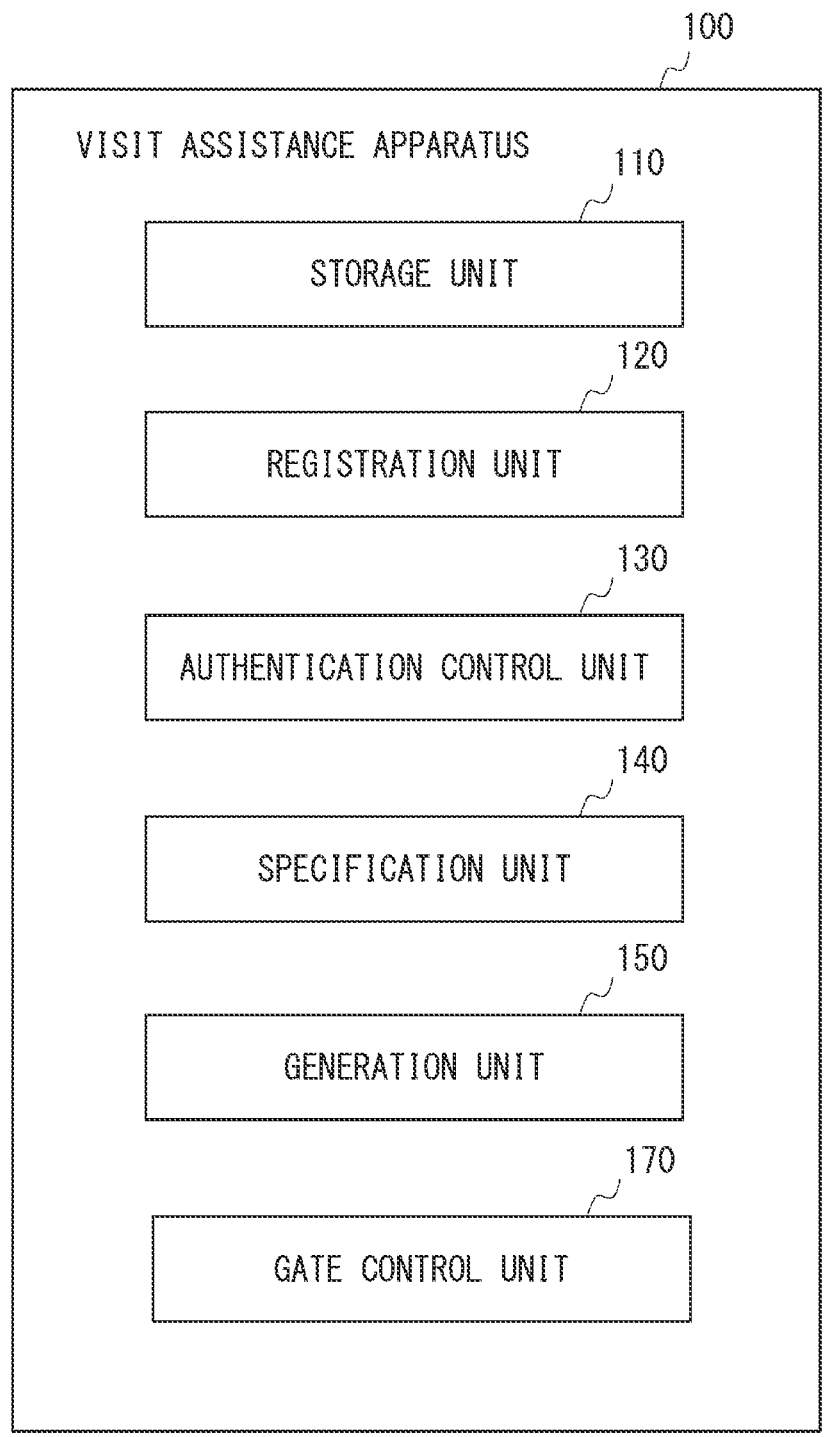
FIG. 3 is a block diagram showing a configuration of a visit assistance apparatus according to a second example embodiment.

FIG. 3 is a block diagram showing a configuration of a visit assistance apparatus according to a second example embodiment.

A visit assistance apparatus 100 may be used to guide an external visitor (e.g., a delivery person) to a seat position in a visit destination (a person in a delivery destination) from among a large number of people on the floor while ensuring the security of a relative large organization such as a company (visit destination). As shown in FIG. 3, the visit assistance apparatus 100 includes a storage unit 110, a registration unit 120, an authentication control unit 130, a specification unit 140, a generation unit 150, and a gate control unit 170.

The storage unit 110 stores floor information in which identification information of a plurality of users including the user to be visited on the floor and their respective seat positions are associated with each other. In a relatively large organization such as a company, users are provided with respective seats on the floor. The storage unit 110 stores identification information of each user (e.g., the user ID, the name, the department to which he/she belongs, the e-mail address, the date of birth, or a combination thereof) in association with the seat positions of the respective users. The identification information of the user uniquely identifies the user. The seat position (or desk position) of each user may be indicated, for example, by an area number (e.g., area A, area B, . . . ) obtained by dividing the floor or by the seat number indicating the seat position of the target user.

The registration unit 120 acquires the face image of the visitor, identification information of the visitor, and identification information of the user to be visited and registers visit assistance information in which the identification information of the visitor is associated with the identification information of the user to be visited in the storage unit 110. The registration unit 120 further registers the face image of the visitor or face feature information based on the face image of the visitor in the authentication apparatus. The identification information of the visitor is, for example, the visitor ID, the name, the department to which he/she belongs, the e-mail address, the date of birth, or a combination thereof.

The authentication control unit 130 acquires a captured image obtained by photographing the visitor by a camera installed in an entry control apparatus including a gate that restricts an entry to a floor, and causes the authentication apparatus to perform face authentication on the captured image using the face image of the visitor registered in advance or face feature information based on this face image.

When the face of the visitor has been successfully authenticated, the specification unit 140 specifies the identification information of the user to be visited based on the visit assistance information and specifies the seat position of the user to be visited that is associated with the specified identification information of the user to be visited based on the floor information.

The generation unit 150 generates guide information for guiding the specified seat position of the user to be visited on the floor. The guide information, which is information for guiding the visitor to the seat position of the user to be visited, may include, for example, the floor number, the area number on the floor, the seat number, or the direction to the seat position.

As described above, when the face of the visitor has been successfully authenticated, the gate control unit 170 releases gate restrictions. This allows the visitor to reach, after passing through the gate, the seat position of the user to be visited or an area near the seat position based on the guide information.

Figure 4:
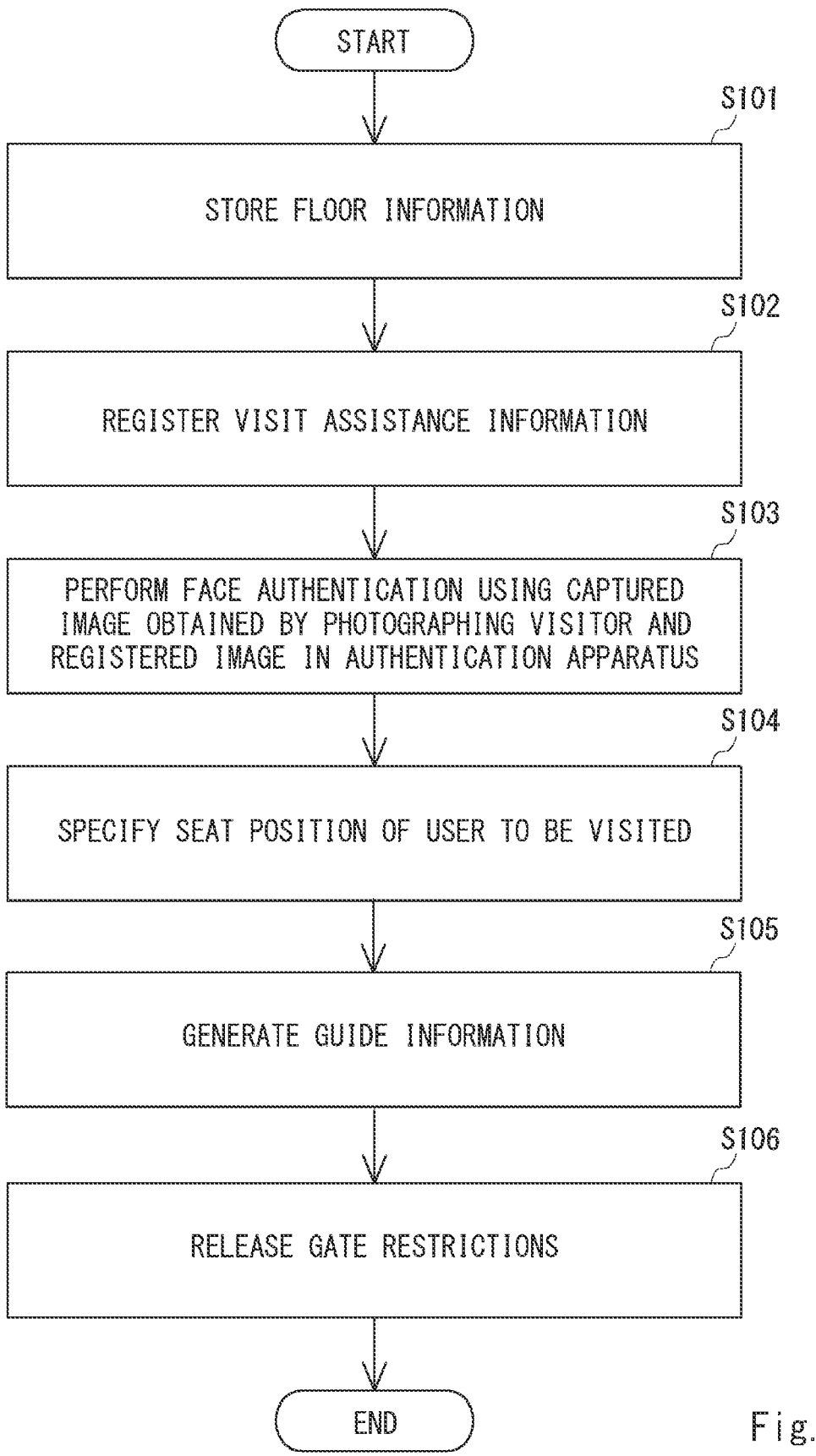
FIG. 4 is a flowchart showing a flow of a visit assistance method according to the second example embodiment.

FIG. 4 is a flowchart showing a flow of a visit assistance method according to the second example embodiment.

First, the floor information in which identification information of a plurality of users including the user to be visited on the floor and the respective seat positions are associated with each other is stored in the storage unit 110 (Step S101). Next, the face image of the visitor, the identification information of the visitor, and the identification information of the user to be visited are acquired and the visit assistance information in which the identification information of the visitor is associated with the identification information of the user to be visited is registered in the storage unit 110 (Step S102). Further, face feature information based on the face image of the visitor is registered in the authentication apparatus.

Next, a captured image obtained by photographing the visitor by the camera installed in the entry control apparatus including the gate that restricts an entry to the floor is acquired and face authentication using face feature information is performed on the registered face image in the authentication apparatus and the captured image (Step S103). When the face authentication has been successfully performed, the identification information of the user to be visited is specified based on the visit assistance information, and the seat position of the user to be visited associated with the specified identification information of the user to be visited is specified based on the floor information (Step S104). Further, guide information for guiding the visitor to the specified seat position of the user to be visited on the floor is generated (Step S105). Further, as described above, when the face of the visitor has been successfully authenticated, gate restrictions are released (Step S106).

The processes shown in the flowchart in FIG. 4 may be executed in various orders, executed in parallel to one another, or omitted. Additional processes may be executed as well.

While the case in which the visit assistance apparatus 100 includes the storage unit 110 has been described in this example embodiment, the storage unit 110 may be connected to an external part of the visit assistance apparatus 100 via a network. In this case, the visit assistance apparatus is able to store the visit assistance information, specify the identification information of the visitor from the face image of the visitor, specify the identification information of the user to be visited from the specified identification information of the visitor, search for the external storage unit using the identification information of the user to be visited as a key, and specify the seat position of the user to be visited.

As described above, according to this example embodiment, it is possible to guide a visitor to a seat position in the visit destination or to an area near the seat position while ensuring the security of the visit destination.

Third Example Embodiment

Figure 5:
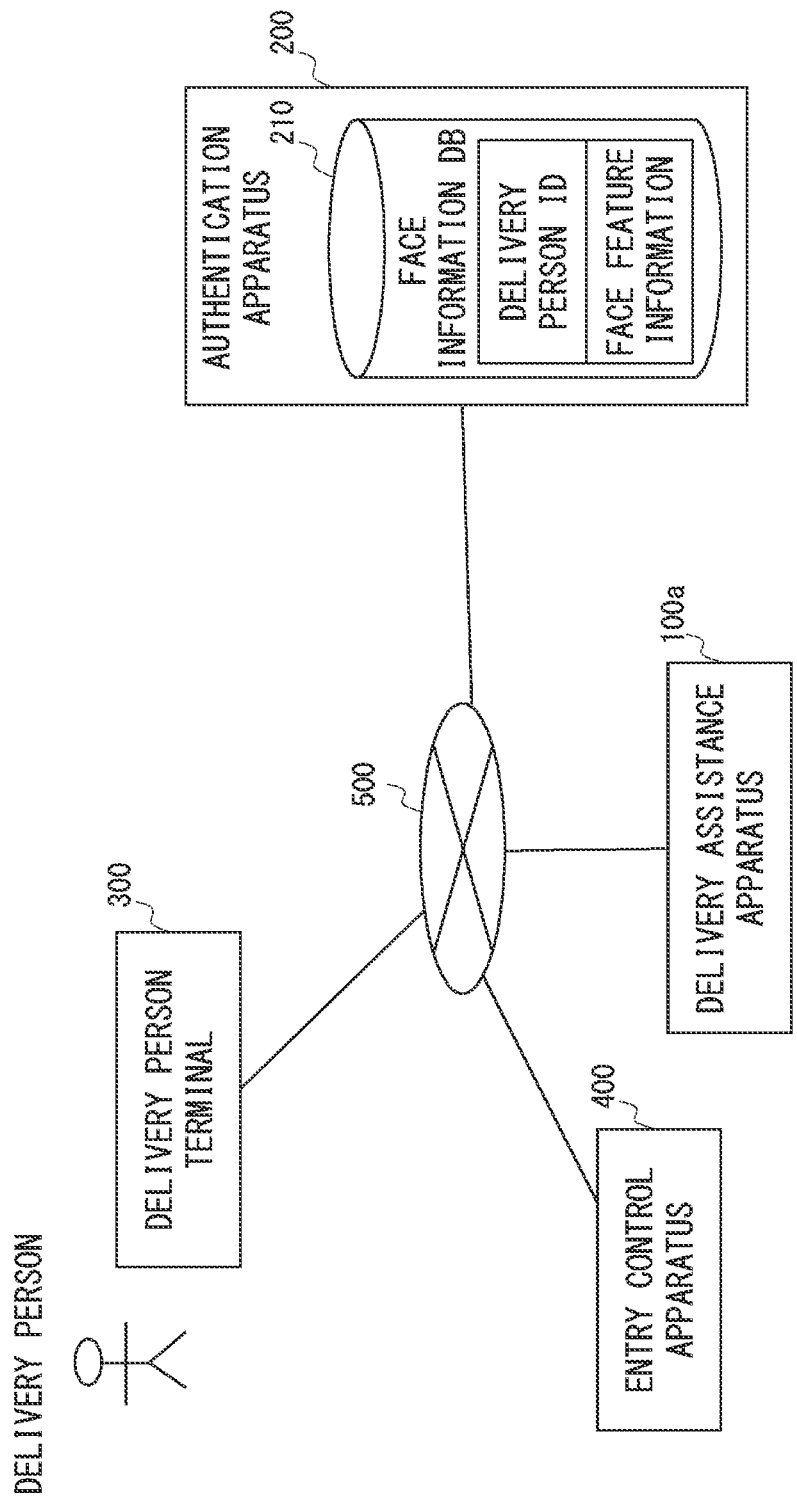
FIG. 5 is a block diagram showing a configuration of a delivery assistance system according to a third example embodiment.

FIG. 5 is a block diagram showing a configuration of a delivery assistance system according to a third example embodiment. The delivery assistance system may be used for a delivery service for delivering a product ordered by an orderer online to the orderer. In particular, the delivery assistance system is useful to specify the position of the orderer from among a large number of people while ensuring security of the delivery destination when the orderer belongs to a relatively large organization such as a company. In this specification, people who belong to this organization and may use the delivery service may each be referred to as a user.

As shown in FIG. 5, the delivery assistance system includes a delivery assistance apparatus 100*a*, an authentication apparatus 200, a delivery person terminal 300, and an entry control apparatus 400. The delivery assistance apparatus 100*a*, the authentication apparatus 200, the delivery person terminal 300, and the entry control apparatus 400 are connected to one another via a wired or wireless network 500. The delivery assistance apparatus 100*a* according to this example embodiment is one example of the visit assistance apparatus 100.

Figure 6:
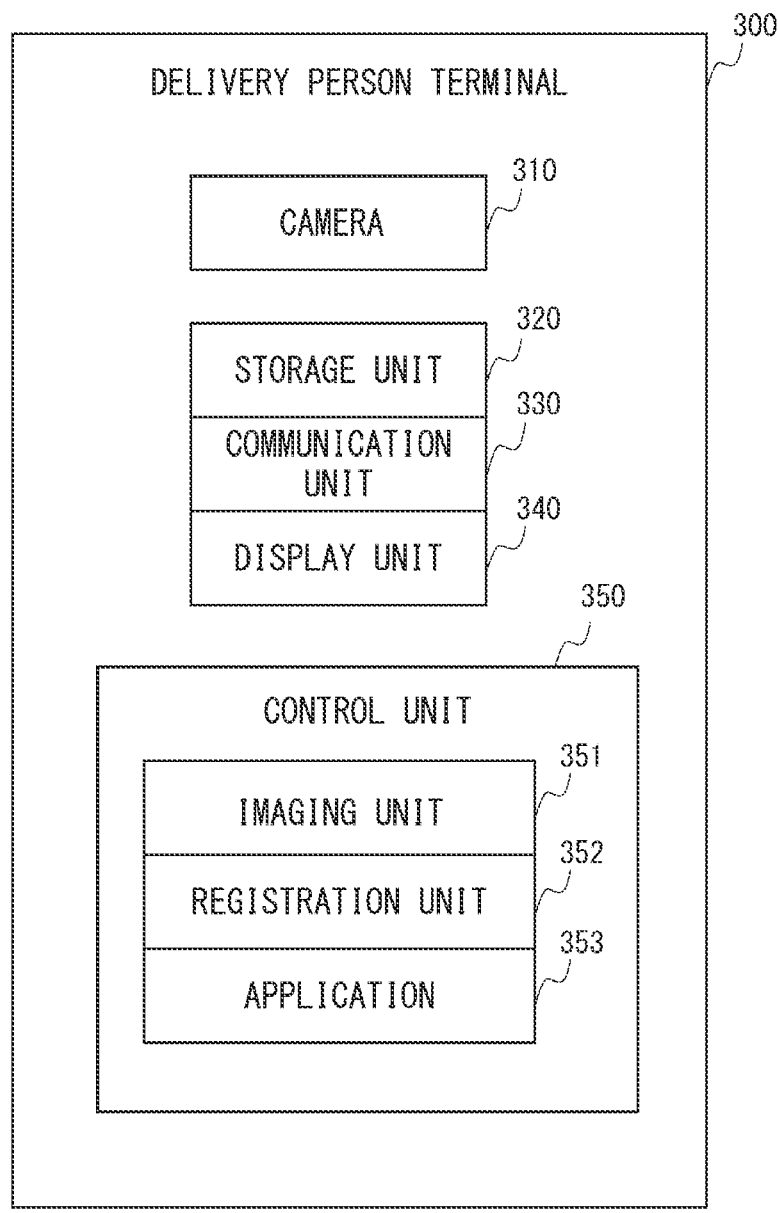
FIG. 6 is a block diagram showing a configuration of a delivery person terminal according to the third example embodiment.

FIG. 6 is a block diagram showing a configuration of the delivery person terminal 300.

The delivery person terminal 300, which is a terminal held by the delivery person, may be, for example, an information processing apparatus such as a smartphone, a tablet, a Personal Computer (PC), or a wearable device. The delivery person terminal 300 is able to acquire order information when it has received an order placed by the orderer to deliver the product. The order information may include orderer information (e.g., the name of the orderer, the telephone number of the orderer, the e-mail address of the orderer, and the orderer ID), and details of the order (e.g., a delivery place and a delivery object). Further, the delivery person terminal 300 is able to transmit a delivery registration request including the orderer information input by the delivery person and the face photograph image of the delivery person to the delivery assistance apparatus 100a via the network 500.

As shown in FIG. 6, the delivery person terminal 300 includes a camera 310, a storage unit 320, a communication unit 330, a display unit 340, and a control unit 350. The control unit 350 further includes an imaging unit 351, a registration unit 352, and an application 353.

The camera 310 converts a subject image formed by an optical lens in a lens barrel into image data by an image-capturing unit and displays, based on this image data after the conversion, a live-view image of the subject image in the display unit 340. Further, the camera 310 stores image data such as a still image or a video image in the storage unit 320. The camera 310 may be used, in particular, to capture the face image of the delivery person or scan an identification with a face image (e.g., a driver's license) of the delivery person. The storage unit 320 stores image data such as a still image or a video image or a program for implementing each function of the delivery person terminal 300. The storage unit 320 is formed, for example, of a semiconductor memory, an optical disc, or a Hard Disc (HD).

The communication unit 330 is a communication interface with the network 500. The communication unit 330 is used to communicate with another network node apparatus that forms the delivery assistance system. The communication unit 330 may be used to perform wireless communication. For example, the communication unit 330 may be used, for example, to perform wireless LAN communication defined in IEEE 802.11 series or a mobile communication defined by the 3rd Generation Partnership Project (3GPP).

The display unit 340 is formed of, for example, a touch screen display or the like. That is, the display unit 340 also functions as a reception unit that receives an operation input by the delivery person. The display unit 340 is further able to display guide information for guiding the delivery person to the seat position of the orderer, who is at the delivery destination, or an area near the seat position on the application 353.

The control unit 350, which is formed of a processor, a memory and the like, loads software (computer program) from a memory to execute the loaded software (computer program), thereby performing various kinds of processing of the delivery person terminal. Further, the control unit 350 controls hardware included in the delivery person terminal 300. The processor may be, for example, a microprocessor, a Micro Processing Unit (MPU), or a Central Processing Unit (CPU). The processor may include a plurality of processors. The control unit 350 includes the imaging unit 351, the registration unit 352, and the application 353.

The imaging unit 351 controls the camera 310 and captures a registration image of the delivery person. The registration image is an image including at least the face of the delivery person. The registration unit 352 transmits a face information registration request including the registration image to the authentication apparatus 200 via the network 500. Note that the delivery person terminal 300 may display an output image on the screen of the display unit 340. The application 353 is an application program installed by a user (in this example, the delivery person). The application 353 can be logged in using login information specific to the delivery person (e.g., a combination of identification information specific to the user with the password), can receive information specific to the delivery person from the delivery assistance apparatus 100a, and can be provided for the delivery person.

Figure 7:
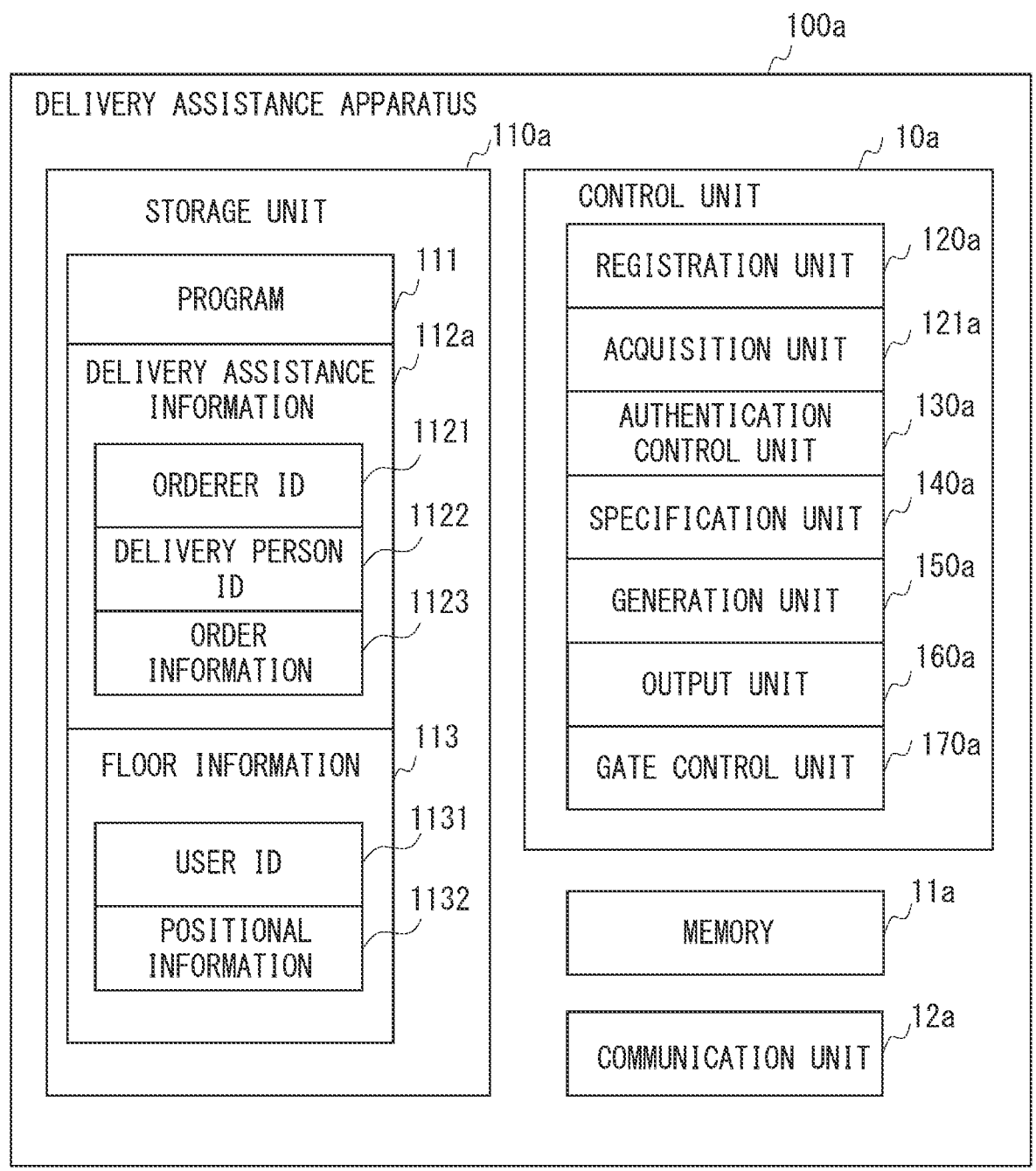
FIG. 7 is a block diagram showing a configuration of a delivery assistance apparatus according to the third example embodiment.

FIG. 7 is a block diagram showing a configuration of the delivery assistance apparatus 100a.

The delivery assistance apparatus 100a is an information processing apparatus (e.g., a server implemented by a computer) that performs, for example, processing of registering the delivery person and the like and processing of authenticating the delivery person. The delivery assistance apparatus 100a includes a control unit 10a, a memory 11a, a communication unit 12a, and a storage unit 110a. Note that the delivery assistance apparatus 100a is one specific example of the visit assistance apparatus 100 according to the first or second example embodiment.

The control unit 10a, which is a control apparatus that controls an operation of the delivery assistance apparatus 100a, is formed of, for example, a processor such as a CPU. The memory 11a, which is a storage area that temporarily stores the content of the processing in the control unit 10a, is, for example, a volatile storage apparatus such as RAM. The control unit 10a causes the memory 11a to load a program 111 from the storage unit 110a and executes various kinds of processing. Specifically, the control unit 10a functions as a registration unit 120a, an acquisition unit 121a, an authentication control unit 130a, a specification unit 140a, a generation unit 150a, an output unit 160a, and a gate control unit 170a.

The storage unit 110a includes a program 111, a delivery assistance information 112a, and a floor information 113. The delivery assistance information 112 includes an orderer ID 1121, a delivery person ID 1122, and order information 1123. The floor information 113 includes a user ID 1131 and positional information 1132 indicating the position for each user ID.

The storage unit 110a stores the orderer ID in association with the delivery person ID as the delivery assistance information. The storage unit 110a may further store other orderer identification information (e.g., the name, the department to which he/she belongs, or the age) associated with the orderer ID. The storage unit 110a may store other orderer identification information (e.g., the name, the department to which he/she belongs, or the age) associated with the delivery person ID. Further, the delivery assistance information may include the order information 1123 indicating specific order information (the ordered item, the date and time of the order, the payment method, etc.)

Further, the storage unit 110a stores the floor information in which the identification information (the user ID 1131) of a plurality of users including the orderer on the floor and the positional information 1132 such as respective seat positions are associated with each other. In a relatively large organization such as a company, users are provided with respective seats on the floor. The storage unit 110a stores identification information of each user (e.g., the user ID, the name, the department to which he/she belongs, the e-mail address, the date of birth, or a combination thereof) in association with the seat positions of the respective users. The seat position of each user may be indicated, for example, by an area number (e.g., area A, area B,) obtained by dividing the floor or by the seat number indicating the seat position of the target user.

The acquisition unit 121a acquires the face image of the delivery person and identification information of the user who has placed the order from the delivery person terminal 300.

The registration unit 120a registers the delivery assistance information in which the identification information of the delivery person (e.g., the delivery person ID) is associated with the identification information of the user who has placed the order (e.g., the orderer ID) in the storage unit 110a. Further, the registration unit 120a registers the face image of the delivery person or the face feature information based on the face image of the delivery person in association with the identification information of the delivery person in the authentication apparatus 200.

The authentication control unit 130a acquires a captured image obtained by photographing the delivery person by the camera installed in the entry control apparatus including the gate that restricts an entry to a floor and causes the authentication apparatus 200 to perform face authentication on the captured image using the face feature information.

When the face of the delivery person has been successfully authenticated, the specification unit 140a specifies the identification information of the user who has placed the order (orderer ID) based on the delivery assistance information and specifies the seat position that is associated with the specified identification information of the user who has placed the order based on the floor information.

The generation unit 150a generates guide information for guiding the delivery person to the specified seat position of the user who has placed the order on the floor. The guide information may include information for guiding the delivery person to the seat position of the user who has placed the order (e.g., information indicating the floor number, the area number on the floor, the seat number, or the direction to the seat position). The guide information may further include information on the distance from the current position to the seat position of the user who has placed the order or information regarding a time required for the delivery.

The output unit 160a transmits the guide information to the delivery person terminal 300, the entry control apparatus 400 or the like. Since the delivery person terminal 300 or the entry control apparatus 400 respectively includes the display unit 340 and a display unit 440, the received guide information can be displayed thereon.

When the face of the delivery person has been successfully authenticated, the gate control unit 170 releases gate restrictions. Accordingly, after passing through the gate, the delivery person is able to deliver the ordered item to the seat of the user who has placed the order based on the guide information. The gate used herein may be gates of various forms such as a flapper gate, a doorless gate, or an automatic gate.

The communication unit 12a is an interface that communicates with an external part of the delivery assistance apparatus. The communication unit 12a is used to communicate with another network node apparatus that forms a stay management system. The communication unit 12a may be used to perform wireless communication. The communication unit 12a may be used, for example, to perform wireless LAN communication defined in IEEE 802.11 series or a mobile communication defined by the 3rd Generation Partnership Project (3GPP). Alternatively, the communication unit 12a may include, for example, a network interface card (NIC) that is in compliance with IEEE 802.3 series.

Figure 8:
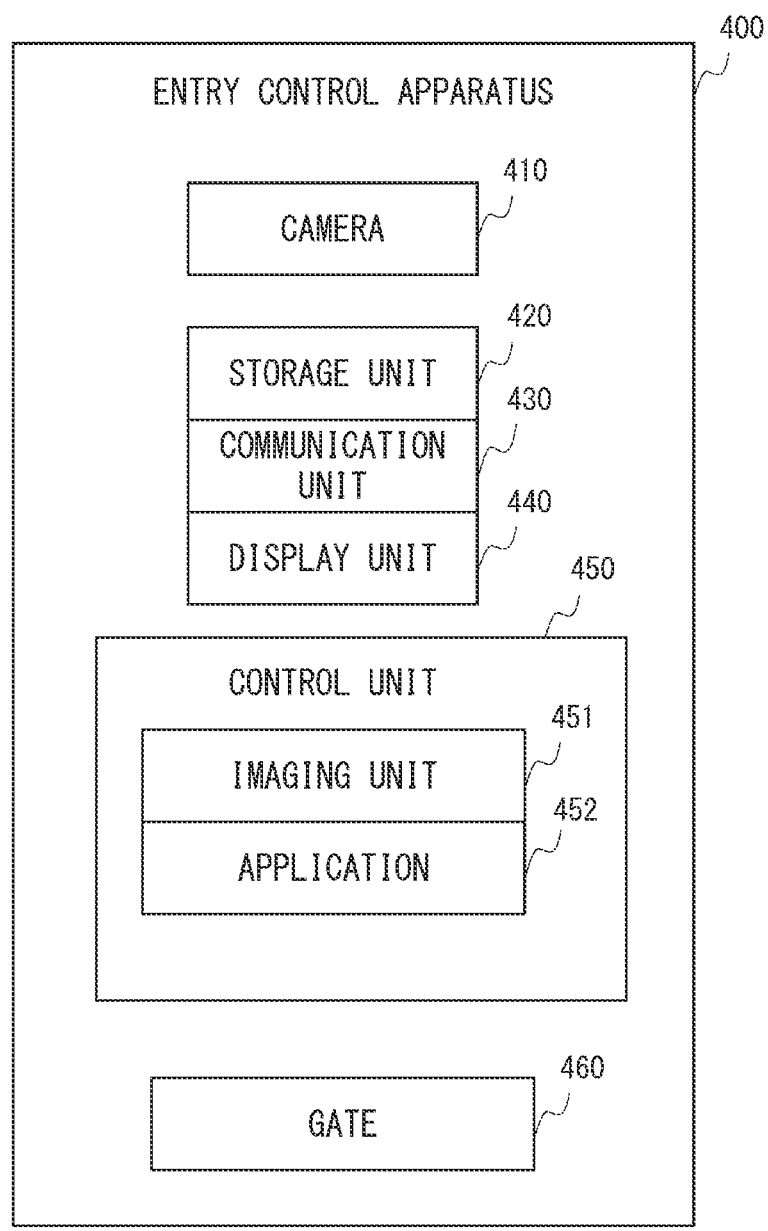
FIG. 8 is a block diagram showing a configuration of an entry control apparatus according to the third example embodiment.

FIG. 8 is a block diagram showing a configuration of the entry control apparatus. The entry control apparatus 400, which is installed in a building of a relative large organization such as a company, may be used to regulate entries of external visitors in order to ensure the security. The entry control apparatus 400 may be located near the entrance of the building or located at each entrance of the floor of the building.

As shown in FIG. 8, the entry control apparatus 400 includes a camera 410, a storage unit 420, a communication unit 430, a display unit 440, a control unit 450, an imaging unit 451, an application 452, and a gate 460. While the entry control apparatus 400 includes the camera 410, the display unit 440, and the gate 460 in this example, the entry control apparatus 400 may not include them. In this case, the entry control apparatus 400 may be implemented by being connected to the external camera 410, the display unit 440, and the gate 460 via a network.

The camera 410 converts a subject image formed by an optical lens in a lens barrel into image data by an image-capturing unit and displays, based on this image data after the conversion, a live-view image of the subject image in the display unit 440. The camera 410 further stores image data of a still image or a video image in the storage unit 420. The camera 410 may be used, in particular, to capture images of people (e.g., delivery persons, visitors, or employees of a company) who enter a building of a relative large organization such as a company. The storage unit 420 is formed of, for example, a semiconductor memory, an optical disc, or a Hard Disc (HD).

The communication unit 430 is a communication interface with the network 500, like the communication unit 330 of the delivery person terminal 300. The communication unit 430 is able to transmit the captured image data to the delivery assistance apparatus 100a via the network 500.

The display unit 440 is formed of, for example, a liquid crystal display or an organic Electro Luminescence (EL) display. The display unit 440 is able to display a live-view image of image data captured by the camera 410. The display unit 440 is further able to display, for example, guide information for guiding the delivery person to the seat position of the user who has placed the order via the application 452.

The control unit 450 is formed of a processor, a memory and the like and loads software (computer program) from the memory to execute the loaded software (computer program), thereby performing various kinds of processing of the entry control apparatus. Further, the control unit 450 controls hardware (e.g., a camera, a gate, or a display unit) included in the entry control apparatus or connected to an external part of the entry control apparatus. The processor may be, for example, a microprocessor, a Micro Processing Unit (MPU), or a Central Processing Unit (CPU).

The control unit 450 includes the imaging unit 451 and the application 452. The imaging unit 451 controls the camera 410 and captures images including the face image of the delivery person or the like. The application 452 is logged in by login information (e.g., a combination of identification information specific to an organization and a password) specific to an organization (building) such as a company and provides the delivery assistance information from the delivery assistance apparatus 100a.

The gate 460 restricts passage of visitors each of inside and outside the building (or the floor). The gate 460 is automatically opened and closed by the control by the entry control apparatus 400. When the entry control apparatus 400 has received a gate release instruction from the delivery assistance apparatus 100a via the network, the entry control apparatus 400 releases the gate restrictions.

Figure 9:
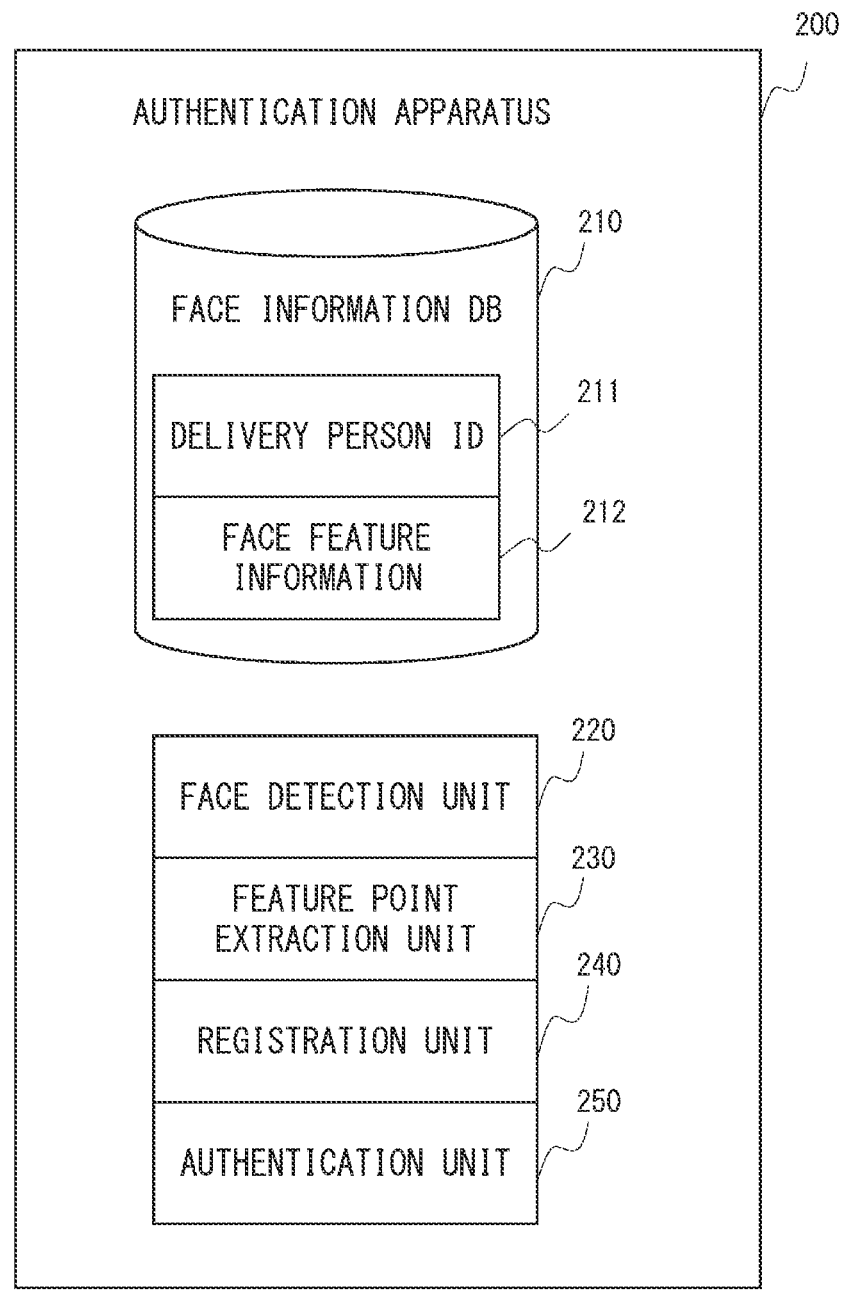
FIG. 9 is a block diagram showing a configuration of an authentication apparatus according to the third example embodiment.

FIG. 9 is a block diagram showing a configuration of the authentication apparatus 200. The authentication apparatus 200 includes a face information DB 210, a face detection unit 220, a feature point extraction unit 230, a registration unit 240, and an authentication unit 250.

The face information DB 210 stores the delivery person ID in association with the face feature information of this delivery person. The face information DB 210 is also referred to as a storage unit. Further, the authentication apparatus 200 compares, in accordance with a face authentication request that has been externally received (e.g., received from the delivery assistance apparatus 100a), the face image or the face feature information included in the request with the face feature information of each delivery person and sends the result of the comparison back to the request source.

The face detection unit 220 detects a face region included in the registration image for registering face information and outputs the detected face region to the feature point extraction unit 230. The feature point extraction unit 230 extracts feature points from the face region detected by the face detection unit 220 and outputs the face feature information to the registration unit 240. The face feature information is a set of feature points that have been extracted. Further, the feature point extraction unit 230 extracts the feature points included in the face image received from the delivery assistance apparatus 100a and outputs the face feature information to the authentication unit 250.

The registration unit 240 newly issues a delivery person ID when it registers the face feature information. The registration unit 240 registers the issued delivery person ID in association with the face feature information extracted from the registration image in the face information DB 210. The authentication unit 250 compares the face feature information extracted from the face image (captured image) with the face feature information in the face information DB 210. The authentication unit 250 sends information indicating whether or not the two face feature information items match each other back to the delivery assistance apparatus 100a. The information indicating whether or not the two face feature information items match each other corresponds to information indicating whether or not authentication has been successfully performed.

Figure 10:
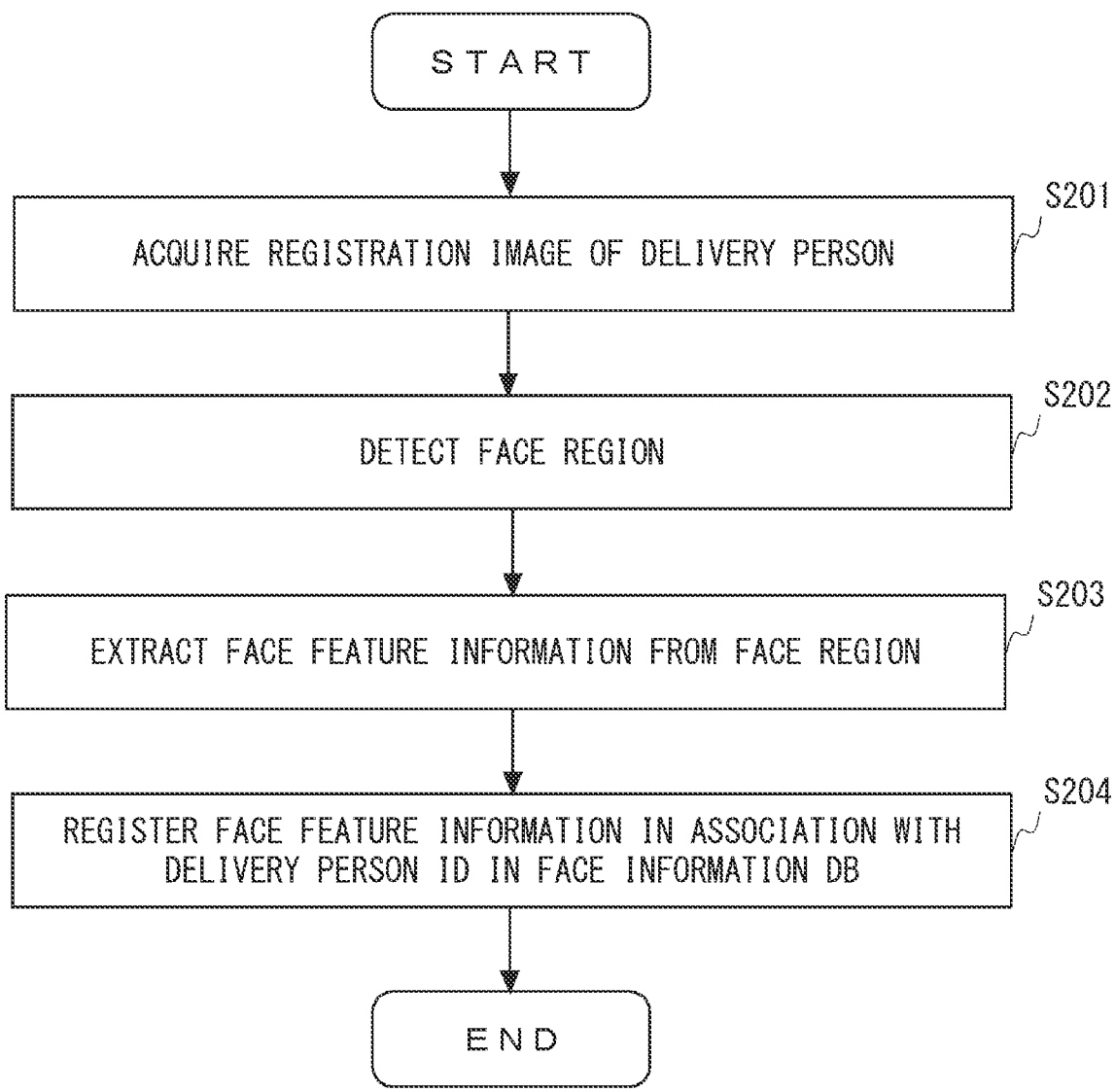
FIG. 10 is a flowchart showing a flow of face information registration processing according to the third example embodiment.

FIG. 10 is a flowchart showing a flow of face information registration processing by the authentication apparatus 200. First, the authentication apparatus 200 acquires a registration image of the delivery person included in a face information registration request (Step S201). For example, the authentication apparatus 200 receives the face information registration request from the delivery assistance apparatus 100a via the network 500. Next, the face detection unit 220 detects a face region included in the registration image of the delivery person (Step S202). Next, the feature point extraction unit 230 extracts feature points from the face region detected in Step S202 and outputs the face feature information to the registration unit 240 (Step S203). Lastly, the registration unit 240 issues a delivery person ID and registers the delivery person ID in association with the face feature information in the face information DB 210 (Step S204). Here, the issued delivery person ID may be associated with, for example, the name, the department to which he/she belongs, the e-mail address, the date of birth, or a combination thereof acquired in advance. The authentication apparatus 200 may receive the face feature information from a delivery person terminal or the like and register the received face feature information in association with the delivery person ID in the face information DB 210. The delivery person ID is sent also to the delivery assistance apparatus 100a and is stored as the delivery assistance information. Further, the delivery person ID may be transmitted to the delivery person terminal 300 or the entry control apparatus 400 and stored therein.

Figure 11:
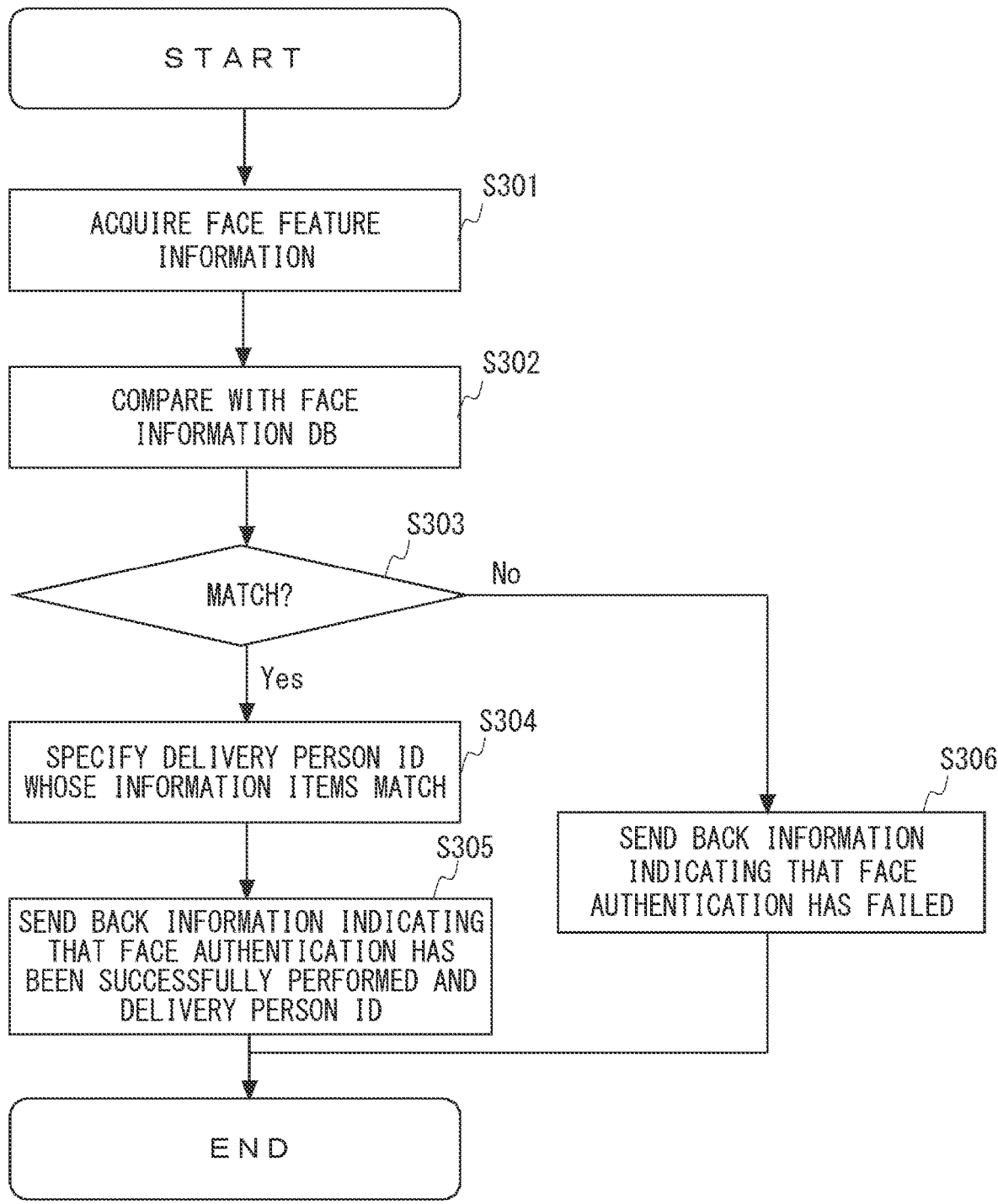
FIG. 11 is a flowchart showing a flow of face authentication processing according to the third example embodiment.

FIG. 11 is a flowchart showing a flow of face authentication processing by the authentication apparatus 200. First, the feature point extraction unit 230 acquires the face feature information from the face image (captured image) received from the delivery assistance apparatus 100a (Step S301). For example, the authentication apparatus 200 receives the face image (captured image) from the delivery assistance apparatus 100a and extracts the face feature information as shown in Steps S201 to S203. Alternatively, the authentication apparatus 200 may receive the face feature information from the delivery assistance apparatus 100a. Next, the authentication unit 250 compares the acquired face feature information of the captured image with the information stored in the face information DB 210 (Step S302). In view of improvement of the accuracy of the comparison, the registration image associated with the delivery person ID may be compared with the acquired face feature information of the captured image, not comparing the acquired face feature information of the captured image with all the image data items in the face information DB 210. In this case, for example, it may be required for the delivery person to input the delivery person ID via a touch panel of the entry control apparatus. When the face feature information items match each other (Yes in Step S303), the authentication unit 250 specifies the delivery person ID of the delivery person whose face feature information items match each other (Step S304), and sends information indicating that the face authentication has been successfully performed and the specified delivery person ID back to the delivery assistance apparatus 100a (Step S305). When there is no face feature information items that match each other (No in Step S303), the authentication unit 250 sends information indicating that face authentication has failed back to the delivery assistance apparatus 100a (Step S306).

Figure 12:
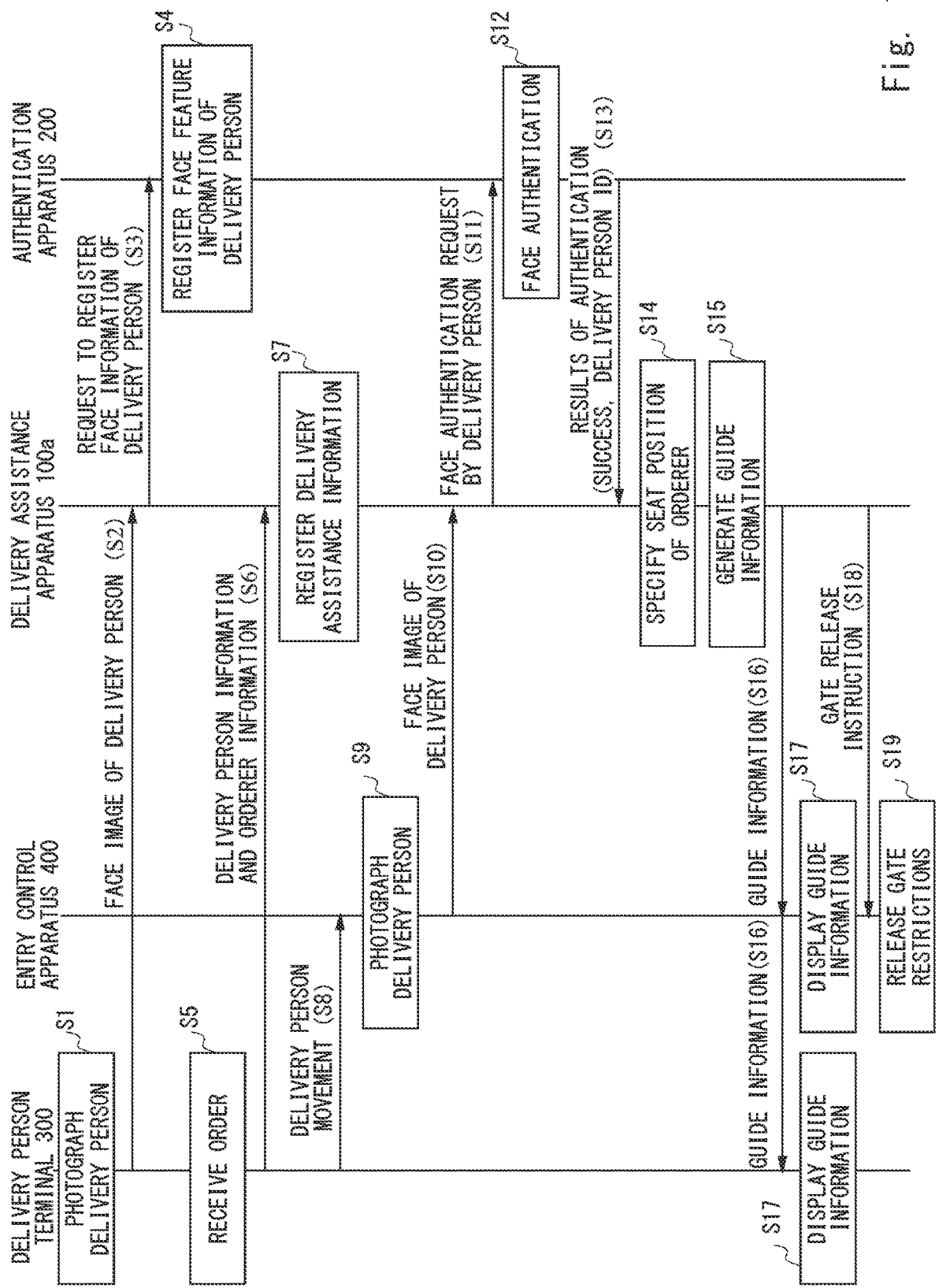
FIG. 12 is a sequence diagram showing an overall operation of a delivery assistance system according to the third example embodiment.

FIG. 12 is a sequence diagram showing an overall operation of the delivery assistance system according to the third example embodiment.

The delivery person photographs his/her own face using the delivery person terminal 300 (Step S1). The delivery person terminal 300 transmits the face image to the delivery assistance apparatus 100a and registers the face image in association with the identification information of the delivery person (Step S2). The identification information of the delivery person is, for example, the delivery person ID, the name, the department to which he/she belongs, the e-mail address, the date of birth, or a combination thereof. After that, the delivery assistance apparatus 100a requests the authentication apparatus 200 to register the face information of the delivery person (Step S3). The authentication apparatus 200 registers the face feature information of this delivery person along with the delivery person ID (Step S4). The delivery person ID is sent back to the delivery assistance apparatus 100a as well and is stored as the delivery assistance information in the storage unit 110a.

The delivery person terminal 300 receives an order placed by the orderer from a server (not shown) that provides the delivery service (Step S5). Upon receiving the order, the delivery person terminal 300 transmits the delivery person identification information and the orderer identification information to the delivery assistance apparatus 100a (Step S6). The delivery assistance apparatus 100a registers the delivery person identification information (including the delivery person ID) in association with the orderer identification information (including the orderer ID) as the delivery assistance information (Step S7).

The delivery person moves to the delivery destination (e.g., a company for which the orderer works) in order to deliver the ordered item (Step S8). At this time, the delivery person may move to the delivery destination carrying the delivery person terminal 300. The entry control apparatus 400 captures the face image (captured image) including at least the face of the delivery person using the camera 410 while regulating the entry of the delivery person using the gate 460 (Step S9). After that, the entry control apparatus 400 transmits the face image (captured image) to the delivery assistance apparatus 100*a* (Step S10). The delivery assistance apparatus 100*a* transmits the face authentication request by the delivery person to the authentication apparatus 200 (Step S11). The authentication apparatus 200 performs face authentication by comparing the face image (captured image) of the delivery person with the face features (of the registration image) registered in advance (Step S12). When the face authentication has been successfully performed, the authentication apparatus 200 transmits the results of the authentication indicating the success and the delivery person ID to the visit assistance apparatus 100*a* (Step S13).

The delivery assistance apparatus 100*a* specifies the seat position of the orderer based on the delivery assistance information in which the orderer ID, the delivery person ID, and the details of the order are associated with one another and the floor information in which the orderer ID and the seat position of the orderer are associated with each other (Step S14). The delivery assistance apparatus 100*a* generates guide information for guiding the delivery person to the specified seat position of the orderer on the floor (Step S15). The output unit 160*a* of the delivery assistance apparatus 100*a* outputs this guide information to the entry control apparatus 400 or the delivery person terminal 300 (Step S16). The display unit of the entry control apparatus 400 or the display unit of the delivery person terminal 300 displays the guide information (Step S17). The delivery assistance apparatus 100*a* transmits a gate release instruction to the entry control apparatus 400 (Step S18). Lastly, the entry control apparatus 400 releases the gate restrictions (Step S19).

Each of the processes of the sequence shown in FIG. 12 is illustrative only. They may be executed in various orders, executed in parallel to one another, or omitted in various example embodiments. Additional processes may be executed as well.

Figure 13:
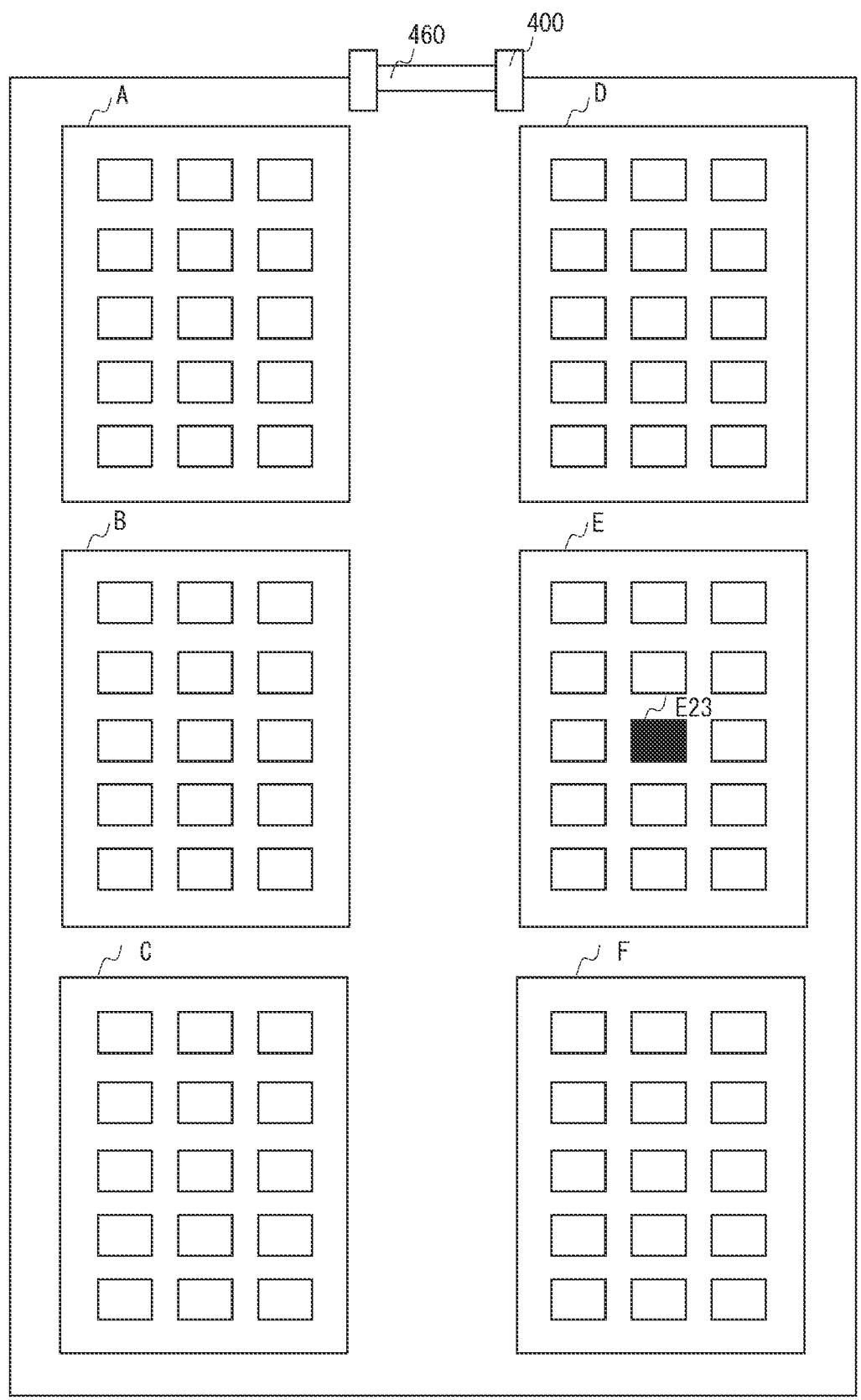
FIG. 13 is a diagram showing one example of guide information.

FIG. 13 is a diagram showing one example of the guide information.

As shown in FIG. 13, an entry control apparatus 400 and a gate 460 that regulates entries of a delivery person and the like into the floor are provided near the entrance of the floor. The entry control apparatus 400 may also be referred to as a floor entry control apparatus. The floor is divided into a plurality of areas (A-F). The areas may correspond, for example, to respective departments in the company. Further, each area includes seat positions of a plurality of users. As shown in FIG. 13, the guide information may indicate that the position of the orderer is E23 in the area E on the map. The guide information is displayed on the display unit of the entry control apparatus 400 or the display unit of the delivery person terminal 300. Further, the guide information to be displayed may include the face image of the orderer. Accordingly, the delivery person is able to recognize the path from the gate 460 to the seat position of the orderer and easily make a delivery.

As described above, the delivery assistance system is able to guide the delivery person to the seat position of the orderer while ensuring security of the delivery destination.

Fourth Example Embodiment

Figure 14:
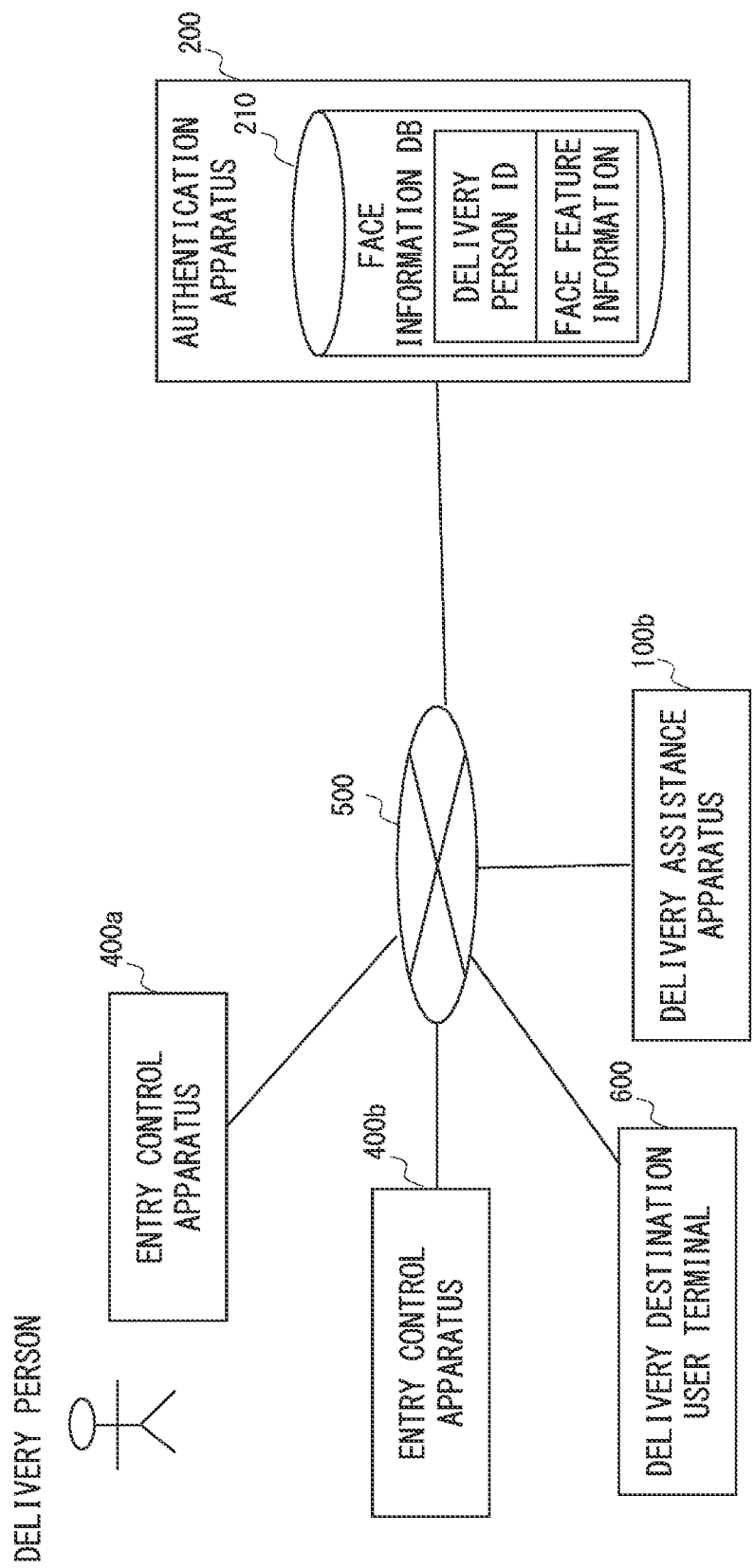
FIG. 14 is a block diagram showing a configuration of a delivery assistance system according to a fourth example embodiment.

FIG. 14 is a block diagram showing a configuration of a delivery assistance system according to a fourth example embodiment.

The delivery assistance system according to the fourth example embodiment includes at least two entry control apparatuses 400*a* and 400*b*, a delivery assistance apparatus 100*b*, an authentication apparatus 200, and a delivery destination user terminal 600. In FIG. 14, the same components as those in the third example embodiment are denoted by the same reference symbols as those in the FIG. 5 and the descriptions thereof will be omitted as appropriate.

Since the configurations of the entry control apparatuses 400*a* and 400*b* and the authentication apparatus 200 are basically the same as those described in the second example embodiment, the descriptions thereof will be omitted.

In the aforementioned third example embodiment, the delivery person captures the face image of himself/herself in advance using the delivery person terminal and registers the face image in the delivery assistance apparatus and the authentication apparatus along with the delivery person information. On the other hand, the fourth example embodiment does not require registration of the face image by the delivery person using the delivery person terminal in advance. After an order has been received, the delivery person visits the delivery destination. The face image for registration is captured at the entrance of the building in the delivery destination. Further, the delivery person registers, when he/she has been permitted to enter by the user at the delivery destination, the face image of the delivery person in the authentication apparatus 200 along with the delivery person identification information.

Specifically, in the fourth example embodiment, the two entry control apparatuses 400*a* and 400*b* are provided in place of the delivery person terminal 300. The entry control apparatus 400*a* (this may also be referred to as a previous-stage entry control apparatus) is provided, for example, near the entrance of the building and the entry control apparatus 400*b* (this may also be referred to as a previous-stage entry control apparatus or a floor entry control apparatus) is provided near the entrance of the floor where the orderer is present. The entry control apparatus 400*a* photographs the delivery person by the camera 410*a* and sends the captured image to the delivery assistance apparatus 100*b*. The delivery assistance apparatus 100*b* is able to send the captured image to the authentication apparatus 200 to cause the captured image to be registered in the authentication apparatus 200.

Further, in the fourth example embodiment, the delivery destination user terminal 600 is added. The delivery destination user terminal 600 may be used to respond to a request that the user (orderer) permit entry of the delivery person into the building or the floor sent by the delivery person through the delivery assistance apparatus 100*b*. The delivery destination user terminal 600 may be a mobile terminal (e.g., a smartphone) that each user has or a computer placed on the seat of each user. The delivery destination user terminal 600 may also be used when each user places an order to have an ordered item delivered by the delivery person.

Figure 15:
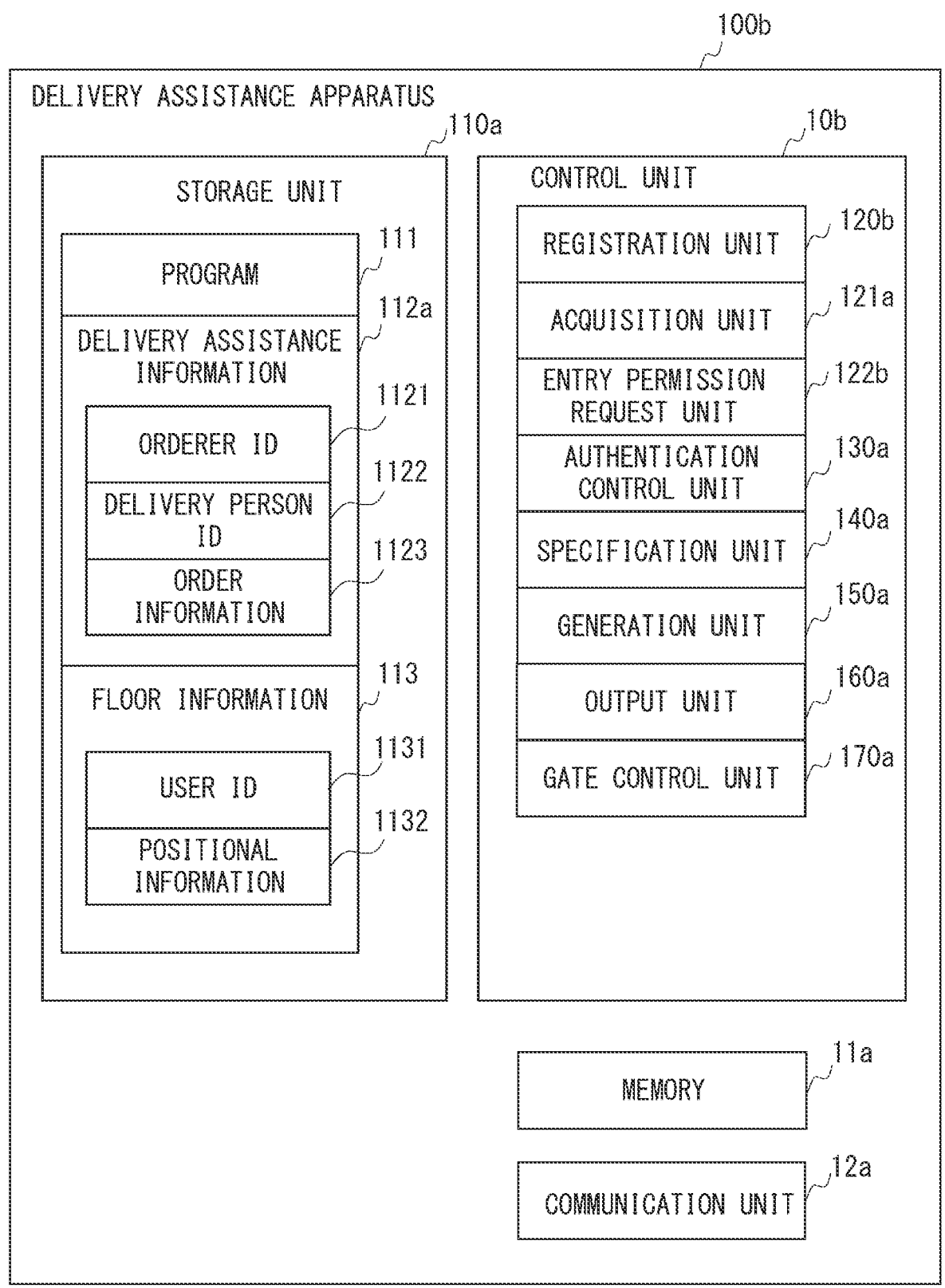
FIG. 15 is a block diagram showing a configuration of a delivery assistance apparatus according to the fourth example embodiment.

FIG. 15 is a block diagram showing a configuration of the delivery assistance apparatus according to the fourth example embodiment.

In FIG. 15, the same components as those in the third example embodiment are denoted by the same reference symbols as those in FIG. 7 and the descriptions thereof will be omitted as appropriate.

A control unit 10*b* of a delivery assistance apparatus 100*b* according to this example embodiment includes a registration unit 120*b* and an entry permission request unit 122*b*.

The acquisition unit 121*a* acquires the face image of the delivery person and the identification information of the user who has placed the order from the entry control apparatus 400*a*.

The entry permission request unit 122*b* receives the entry permission request sent by the delivery person from the entry control apparatus 400*a* and transmits an entry permission request including the face image of the delivery person and the orderer information to the delivery destination user terminal 600 that the orderer uses. After that, the orderer gives an entry permission in response to the entry permission request via the delivery destination user terminal 600.

The registration unit 120*b* registers the delivery assistance information in which the identification information of the delivery person (e.g., the delivery person ID) is associated with the identification information of the user who has placed the order (e.g., the orderer ID) in the storage unit 110*a*. Further, when the entry of the delivery person has been permitted by the delivery destination user terminal 600, the registration unit 120*b* registers the face feature information based on the face image of the delivery person in the authentication apparatus 200 in association with the identification information of the delivery person.

Figure 16:
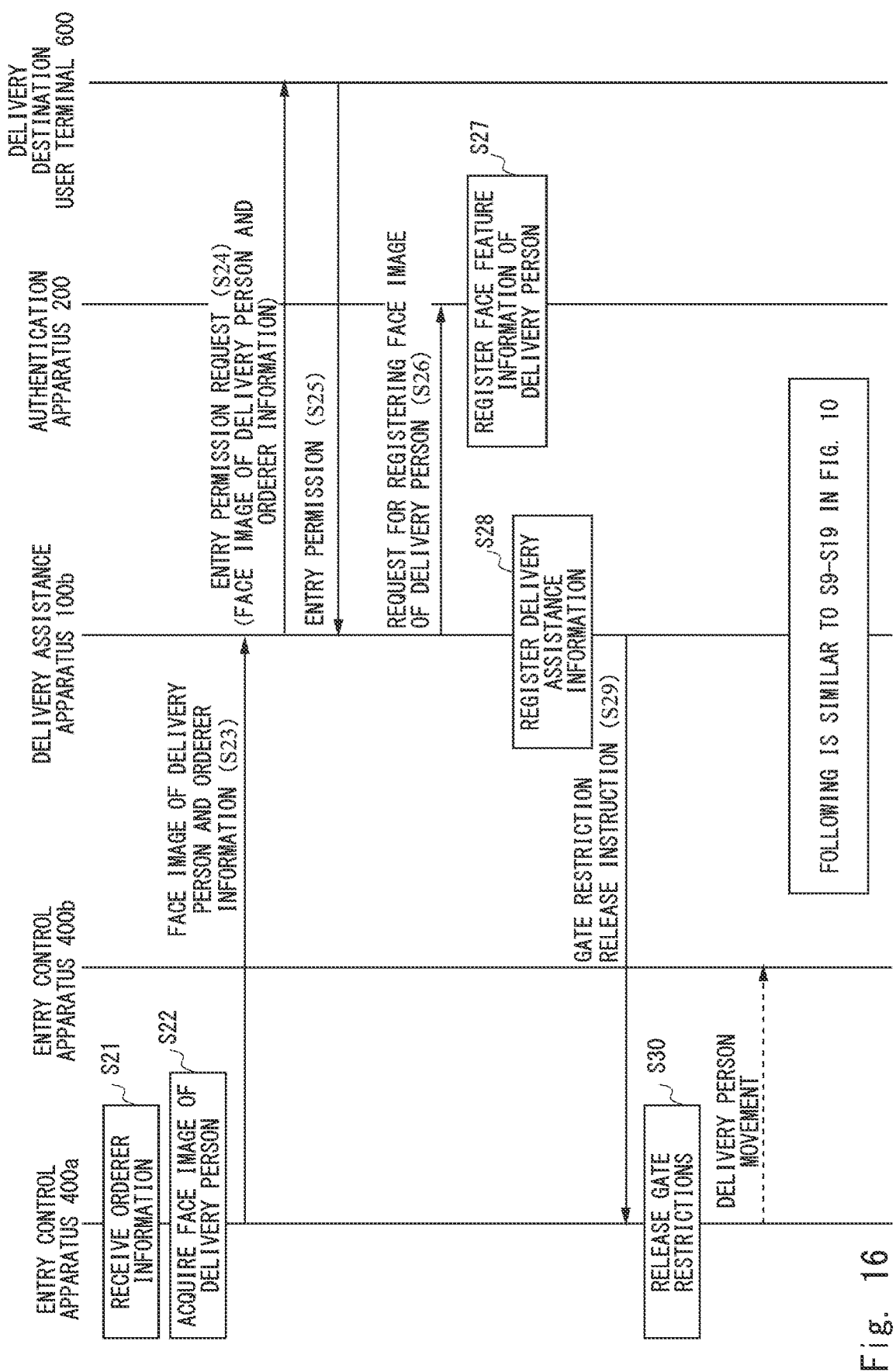
FIG. 16 is a sequence diagram showing preliminary image registration processing in the delivery assistance system according to the fourth example embodiment.

FIG. 16 is a sequence diagram showing preliminary face image registration processing in the delivery assistance system according to the fourth example embodiment.

In the vicinity of the entrance of the building, the entry control apparatus 400*a* receives orderer information associated with the identification information of the delivery person via, for example, an operation input into a display unit including a touch panel by the delivery person (Step S21). The identification information of the delivery person may be, for example, the delivery person ID, the name, the department to which he/she belongs, the e-mail address, the date of birth, or a combination thereof. The delivery person is able to input the orderer information into, for example, an operation unit (e.g., a software keyboard displayed on the display unit) of the entry control apparatus 400*a*. Alternatively, the delivery person may cause the camera 410*a* included in the entry control apparatus 400*a* to read an identification code (e.g., QR code (registered trademark)) indicating the orderer information and the details of the order.

Further, the camera 410*a* of the entry control apparatus 400*a* acquires the face image of the delivery person in association with the identification information of the delivery person (Step S22). The camera 410*a* of the entry control apparatus 400*a* is able to acquire the face image of the delivery person by photographing the face of the delivery person or scanning an identification with a face image (e.g., a driver's license) of the delivery person. Further, at this time, the camera 410*a* of the entry control apparatus 400*a* may photograph the face and scan the identification with the face image, thereby performing face authentication by comparing these face images to confirm that this delivery person is an authorized person. After that, the entry control apparatus 400*a* transmits the face image of the delivery person and the orderer information to the delivery assistance apparatus 100*b* (Step S23).

The entry permission request unit 122*b* of the delivery assistance apparatus 100*b* transmits an entry permission request including the face image of the delivery person and the orderer information to the delivery destination user terminal 600 (Step S24). The delivery destination user terminal 600 sends an entry permission by the orderer in response to the entry permission request back to the delivery assistance apparatus 100*b* (Step S25). After that, the registration unit 120*b* of the delivery assistance apparatus 100*b* transmits a request for registering the face image of the delivery person to the authentication apparatus 200 (Step S26). The authentication apparatus 200 registers the face feature information of this delivery person along with the delivery person ID from the face image (Step S27). The delivery person ID is sent back also to the delivery assistance apparatus 100*b* and is stored in the storage unit as the delivery assistance information.

The registration unit 120*b* of the delivery assistance apparatus 100*b* registers the delivery assistance information in which the identification information of the delivery person is associated with the identification information of the user who has placed the order in the storage unit 110*a* (Step S28). After that, the delivery assistance apparatus 100*b* transmits a gate restriction release instruction to the entry control apparatus 400*a* (Step S29). The entry control apparatus 400*a* releases the gate restrictions (Step S30). After that, the delivery person moves to another entry control apparatus 400*b* installed in a floor where the orderer is present. For example, it may be assumed that the entry control apparatus 400 in FIG. 13 is the entry control apparatus 400*b* according to this example embodiment. Since the following operations are basically the same as those in Steps S9-S19 of FIG. 12, the descriptions thereof will be omitted here.

Each of the processes of the sequence shown in FIG. 16 is illustrative only. They may be executed in various orders, executed in parallel to one another, or omitted in various example embodiments. Additional processes may be executed as well.

According to this example embodiment, even in a case in which the face image of the delivery person is not registered in the authentication apparatus by the delivery person in advance, the image of the delivery person captured by the camera installed in the entry control apparatus at the delivery destination may be registered in the authentication apparatus. Accordingly, the delivery assistance system according to this example embodiment is able to guide the delivery person to the seat position of the orderer while ensuring security of the delivery destination.

Fifth Example Embodiment

A delivery assistance system according to a fifth example embodiment gives an allowed visiting time to a delivery person and outputs an alert to a manager terminal or the like when the allowed visiting time has elapsed.

Figure 17:
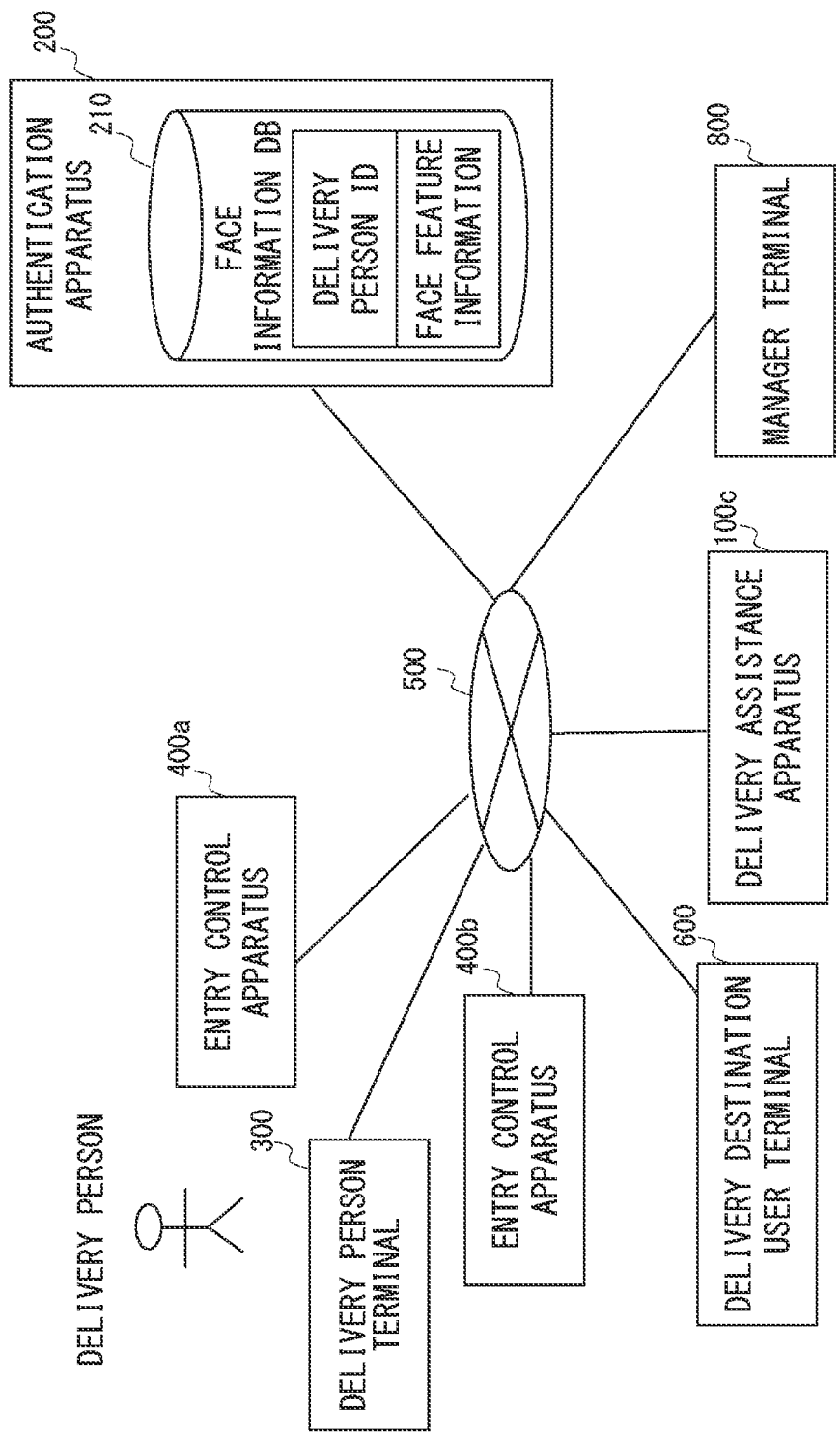
FIG. 17 is a block diagram showing a configuration of a delivery assistance system according to a fifth example embodiment.

FIG. 17 is a block diagram showing a configuration of a delivery assistance system according to a fifth example embodiment.

In FIG. 17, the same components as those in the fourth example embodiment are denoted by the same reference symbols as those in FIG. 14 and the descriptions thereof will be omitted as appropriate. The delivery assistance system according to this example embodiment is different from the delivery assistance system according to the fourth example embodiment shown in FIG. 14 in that the delivery assistance system according to this example embodiment further includes a manager terminal 800. Further, the configuration of a delivery assistance apparatus 100*c* is different from that of the delivery assistance apparatus 100*a* according to the second example embodiment. In the delivery assistance system according to this example embodiment, one or more surveillance cameras for monitoring a delivery person and the like are installed in a building. Further, in the delivery assistance system, an allowed visiting time indicating a time during which the delivery person is allowed to stay in the building or each floor is given to the delivery person who has been permitted to enter. When the allowed visiting time has elapsed, an alarm is output to the manager terminal 800 or the like.

Figure 18:
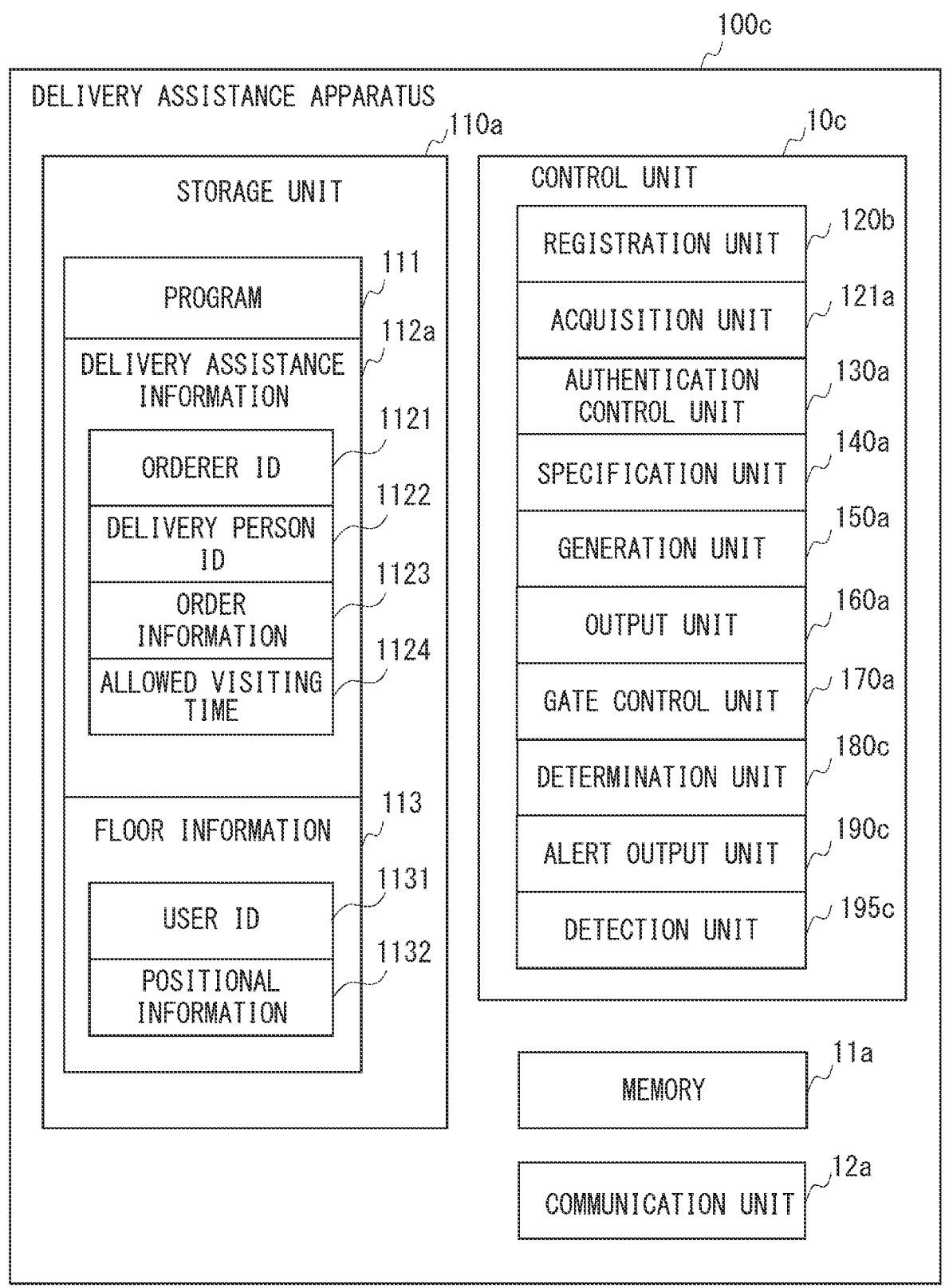
FIG. 18 is a block diagram showing a configuration of a delivery assistance apparatus according to the fifth example embodiment.

FIG. 18 is a block diagram showing a configuration of the delivery assistance apparatus according to the fifth example embodiment.

In FIG. 18, the same components as those in the third example embodiment are denoted by the same reference symbols as those in FIG. 7 and the descriptions thereof will be omitted as appropriate. The delivery assistance apparatus 100 according to this example embodiment further includes a determination unit 180c, an alert output unit 190c, and a detection unit 195c.

The determination unit 180c determines the time allowed for the delivery person to stay based on the guide information for guiding the delivery person to the specified seat position of the user who has placed the order. The determination unit 180c is able to determine the allowed visiting time based on the distance from the position of the entry control apparatus 400a or 400b (i.e., the current position of the delivery person) to the seat position of the orderer or an estimated time required for the delivery. The guide information may include this distance information or information on the time required for the delivery.

Further, the determination unit 180c may start a timer for counting the allowed visiting time when the delivery person has passed through the gate installed near the entry control apparatus 400a or 400b. For example, it may be assumed that the entry control apparatus 400 shown in FIG. 13 is the entry control apparatus 400b according to this example embodiment.

The alert output unit 190c may output an alert to the delivery person terminal 300, the manager terminal 800, the delivery destination user terminal 600 or the like so that the allowed visiting time and a timer for counting down the allowed visiting time are displayed before the allowed visiting time elapses. The alert output unit 190c further outputs, when the allowed visiting time has elapsed, an alert whose form is different from that of the above alert to, for example, the delivery person terminal 300, the manager terminal 800, or the delivery destination user terminal 600. The alert whose form is different from that of the above alert, which is intended to broadcast that the delivery person is still in the company even after the allowed visiting time has elapsed, may be various forms such as an alarm sound, an indication on a display, or lighting of a lamp. Further, the alert whose form is different from that of the above alert may be an indication of the face image of the delivery person (visitor) when it is registered or photographed displayed on the manager terminal 800, the delivery destination user terminal 600 or the like. Alternatively, the alert whose form is different from that of the above alert may be, for example, a sound that becomes larger or a color that turns from yellow to red as the count down reaches 0 or the sound that becomes larger or the color that turns from yellow to red as the time after the allowed visiting time becomes longer. If the delivery person has exited from an exit gate (not shown) within the allowed visiting time, the alert output unit 190c may exclude this delivery person from the target regarding whom the alert is output.

The detection unit 195c detects a delivery person from a surveillance image acquired from one or more surveillance cameras in a building or a floor by face authentication using face feature information. If a delivery person has been detected, the detection unit 195c is able to acquire positional information of the surveillance camera that has acquired the surveillance image. In this case, the alert output unit 190c may output an alert along with the positional information.

Figure 19:
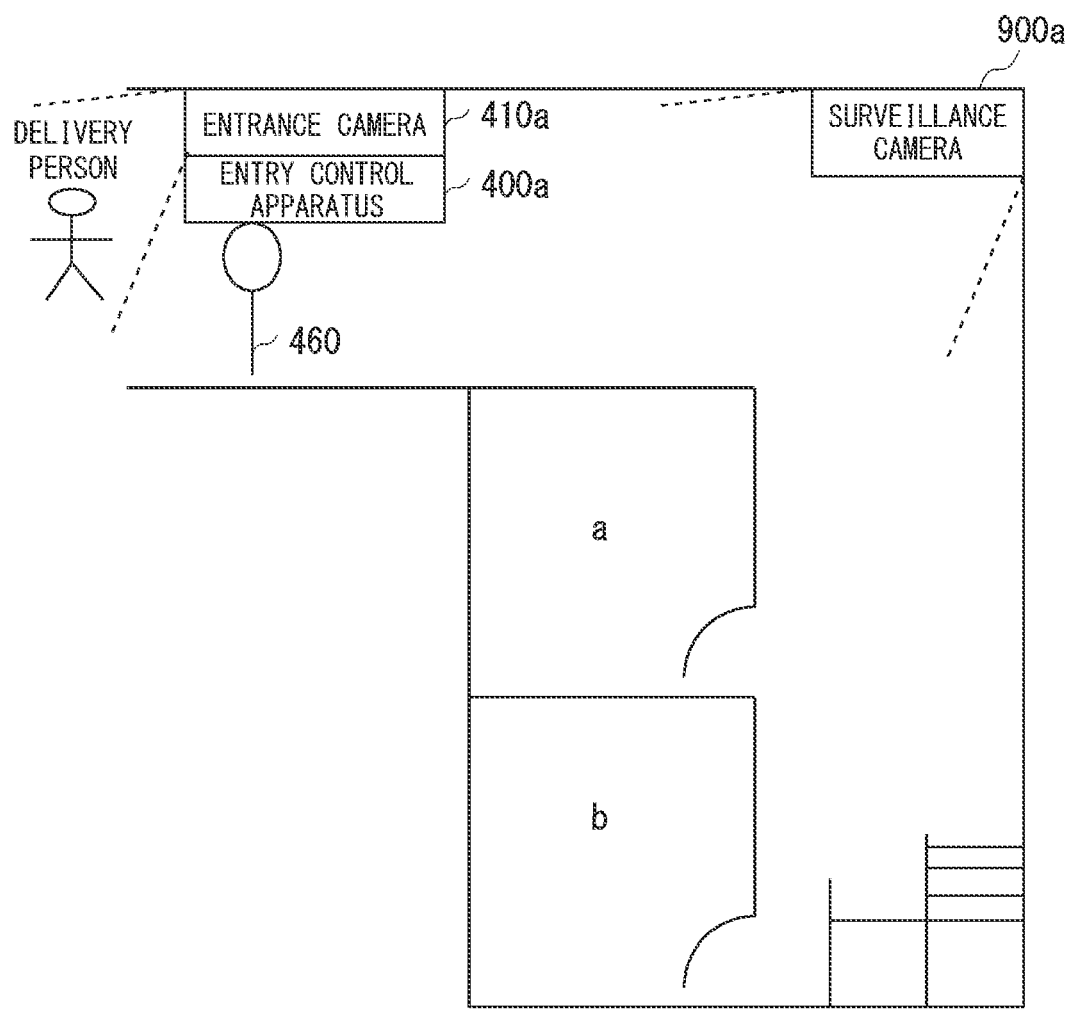
FIG. 19 is a diagram for describing a layout example of the first floor according to the fifth example embodiment.

FIG. 19 is a diagram for describing a layout example of the first floor according to the fifth example embodiment.

The camera 410a located near the entrance of the building is installed so as to capture the delivery person who has arrived at the entrance. As described above, the entry control apparatus 400a regulates the entry of the delivery person into the building by the gate 460a. An allowed visiting time indicating a time during which the delivery person is allowed to stay in the building or each floor is given to the delivery person when he/she passes through the gate 460a. The allowed visiting time may be set in such a way that it becomes longer as the distance from the entry control apparatus 400a to the seat position of the orderer (e.g., E23 in FIG. 13) or the estimated time required for the delivery becomes longer. The estimated time required for the delivery may be set in accordance with moving means (e.g., whether or not there is an elevator or an escalator) from the entry control apparatus 400a to the seat position of the orderer. A surveillance camera 900a is installed so as to monitor the delivery person and the like who have entered the building. At least one surveillance camera 900a may be installed for each floor. When, for example, the surveillance camera 900a on the first floor has detected the delivery person after the allowed visiting time has elapsed, the detection unit 195c sends a notification indicating that the delivery person has been detected to the alert output unit 190c along with the positional information of the surveillance camera 900a. The alert output unit 190c is able to output an alert to, for example, the manager terminal 800 along with the positional information of the surveillance camera 900a.

While the allowed visiting time has been given to the delivery person in the entry control apparatus 400a, the allowed visiting time may be given to the delivery person in the entry control apparatus 400b.

According to this example embodiment, it is possible to further improve the security level by managing the time allowed for the delivery person to stay.

In the aforementioned examples, the program(s) can be stored and provided to a computer using any type of non-transitory computer readable media. Non-transitory computer readable media include any type of tangible storage media. Examples of non-transitory computer readable media include magnetic storage media, optical magnetic storage media (e.g., magneto-optical disks), CD-Read Only Memory (ROM), CD-R, CD-R/W, and semiconductor memories. The magnetic storage media may be, for example, flexible disks, magnetic tapes, hard disk drives, etc. The semiconductor memory may be, for example, a mask ROM, a Programmable ROM (PROM), an Erasable PROM (EPROM), a flash ROM, or a Random Access Memory (RAM). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned example embodiments and may be changed as appropriate without departing from the spirit of the present disclosure. For example, while the entry control apparatus is configured to include a gate in the aforementioned example embodiments, the entry control apparatus may not include a gate. In this case, the entry control apparatus may regulate entries of external visitors by installing an additional surveillance camera or placing a security guard. Further, the present disclosure may be executed by the example embodiments combined with one another as appropriate.

The whole or part of the example embodiment disclosed above can be described as, but not limited to, the following supplementary notes.

(Supplementary Note 1)

A visit assistance apparatus comprising:

a registration unit configured to register a face image of a visitor and visit assistance information in which identification information of the visitor is associated with identification information of a user to be visited;

an authentication control unit configured to cause face authentication to be performed by comparing the face image of the visitor captured by a camera installed in an entry control apparatus that restricts an entry to a floor with the registered face image of the visitor;

a specification unit configured to specify, when the face authentication has been successfully performed, identification information of the user to be visited based on the visit assistance information, and specify the specified seat position of the user to be visited based on floor information in which the identification information of the user to be visited is associated with a seat position of the user to be visited; and a generation unit configured to generate guide information for guiding the visitor to the specified seat position of the user to be visited on the floor.

(Supplementary Note 2)

The visit assistance apparatus according to Supplementary Note 1, further comprising:

a storage unit configured to store floor information in which identification information of a plurality of users including the user to be visited on the floor and the respective seat positions are associated with each other;

a registration unit configured to acquire the face image of the visitor, identification information of the visitor, and identification information of the user to be visited, register visit assistance information in which the identification information of the visitor is associated with the identification information of the user to be visited in the storage unit, and register face feature information based on the face image in an authentication apparatus; and a gate control unit configured to release, when the face authentication has been successfully performed, restrictions on a gate installed near the entry control apparatus.

(Supplementary Note 3)

The visit assistance apparatus according to Supplementary Note 1 or 2, comprising an output unit configured to output the guide information to the entry control apparatus or a terminal that the visitor has.

(Supplementary Note 4)

The visit assistance apparatus according to Supplementary Note 2, wherein the entry control apparatus includes a floor entry control apparatus and a previous-stage entry control apparatus provided in the previous stage of the floor entry control apparatus, the registration unit acquires the face image of the visitor and the identification information of the user to be visited via the previous-stage entry control apparatus, the registration unit transmits an entry permission request including the face image of the visitor and the identification information of the user to be visited to the terminal of the user to be visited on the floor, the registration unit registers, when the entry permission from the terminal of the user to be visited has been received, the visit assistance information in the storage unit and registers the face image in the authentication apparatus, and the gate control unit releases, when the entry permission from the terminal of the user to be visited has been received, restrictions on the gate installed near the previous-stage entry control apparatus.

(Supplementary Note 5)

The visit assistance apparatus according to any one of Supplementary Notes 1 to 4, further comprising:

a determination unit configured to determine an allowed visiting time of the visitor based on guide information for guiding the visitor to the specified seat position of the user to be visited; and an alert output unit configured to output an alert when the allowed visiting time has elapsed.

(Supplementary Note 6)

The visit assistance apparatus according to Supplementary Note 5, further comprising:

a detection unit configured to detect the visitor from a surveillance image acquired from a surveillance camera installed in a building by face authentication using the face image; and an alert output unit configured to output an alert when the visitor has been detected by the detection unit.

(Supplementary Note 7)

The visit assistance apparatus according to Supplementary Note 5 or 6, wherein the alert output unit sends a notification to a manager terminal as an alert output.

(Supplementary Note 8)

The visit assistance apparatus according to Supplementary Note 6, wherein the alert output unit sends a notification regarding the position of the visitor that has been detected by the detection unit along with an alert output.

(Supplementary Note 9)

The visit assistance apparatus according to Supplementary Note 6, wherein the alert output unit sends a notification regarding a terminal owned by the visitor as an alert output.

(Supplementary Note 10)

A visit assistance method comprising:

registering a face image of a visitor and visit assistance information in which identification information of the visitor is associated with identification information of a user to be visited;

causing face authentication to be performed by comparing the face image of the visitor captured by a camera installed in an entry control apparatus that restricts an entry to a floor with the registered face image of the visitor;

specifying, when the face authentication has been successfully performed, the identification information of the user to be visited based on the visit assistance information, and specifying a seat position of the specified user to be visited based on floor information in which the identification information of the user to be visited is associated with the seat position of the user to be visited; and generating guide information for guiding the visitor to the specified seat position of the user to be visited on the floor.

(Supplementary Note 11)

A non-transitory computer readable medium storing a program causing a computer to execute the processing of:

registering a face image of a visitor and visit assistance information in which identification information of the visitor is associated with identification information of a user to be visited;
causing face authentication to be performed by comparing the face image of the visitor captured by a camera installed in an entry control apparatus that restricts an entry to a floor with the registered face image of the visitor;
specifying, when the face authentication has been successfully performed, the identification information of the user to be visited based on the visit assistance information, and specifying a seat position of the specified user to be visited based on floor information in which the identification information of the user to be visited is associated with the seat position of the user to be visited; and
generating guide information for guiding the visitor to the specified seat position of the user to be visited on the floor.

REFERENCE SIGNS LIST

100 Visit Assistance Apparatus
100a Delivery Assistance Apparatus
100b Delivery Assistance Apparatus
110 Storage Unit
111 Program
112 Delivery Assistance Information
113 Floor Information
120 Registration Unit
121 Acquisition Unit
122b Entry Permission Request Unit
130 Authentication Control Unit
140 Specification Unit
150 Generation Unit
160 Output Unit
170 Gate Control Unit
180c Determination Unit
190c Alert Output Unit
195c Detection Unit
200 Authentication Apparatus
210 Face Information DB
220 Face Detection Unit
230 Feature Point Extraction Unit
240 Registration Unit
250 Authentication Unit
300 Delivery Person Terminal
310 Camera
320 Storage Unit
330 Communication Unit
340 Display Unit
350 Control Unit
351 Imaging Unit
352 Registration Unit
353 Application
400 Entry Control Apparatus
400a Entry Control Apparatus (Previous-stage Entry Control Apparatus)
400b Entry Control Apparatus (Floor Entry Control Apparatus)
410 Camera
420 Storage Unit
430 Communication Unit
440 Display Unit
450 Control Unit
451 Imaging Unit
452 Application
460 Gate
500 Network
600 Delivery Destination User Terminal
800 Manager Terminal
900 Surveillance Camera

What is claimed is:

1. A visit assistance apparatus comprising:
a memory storing instructions; and
a processor configured to execute the instructions to:
acquire a face image of a visitor, identification information of the visitor, and identification information of a user to be visited;
register the face image of the visitor and visit assistance information in which the identification information of the visitor is associated with the identification information of the user to be visited;
store floor information in which identification information of a plurality of users including the user to be visited on a floor and seat positions of the plurality of users are respectively associated with each other;
register face feature information based on the face image of the visitor in an authentication apparatus;
cause face authentication to be performed by comparing the face image of the visitor captured by a camera installed in an entry control apparatus that restricts entry to the floor with the registered face image of the visitor;
specify, when the face authentication has been successfully performed, the identification information of the user to be visited based on the visit assistance information;
specify the seat position of the user to be visited based on the floor information in which the identification information of the user to be visited is associated with the seat position of the user to be visited;
release, when the face authentication has been successfully performed, restrictions on a gate installed near the entry control apparatus; and
generate guide information for guiding the visitor to the specified seat position of the user to be visited on the floor, wherein
the entry control apparatus includes a floor entry control apparatus and a previous-stage entry control apparatus provided in a previous stage of the floor entry control apparatus,
the processor acquires the face image of the visitor and the identification information of the user to be visited via the previous-stage entry control apparatus,
the processor transmits an entry permission request including the face image of the visitor and the identification information of the user to be visited to a terminal of the user to be visited on the floor,
the processor registers, when the entry permission from the terminal of the user to be visited has been received, the visit assistance information and registers the face image in the authentication apparatus, and
the processor releases, when the entry permission from the terminal of the user to be visited has been received, the restrictions on the gate installed near the previous-stage entry control apparatus.

2. The visit assistance apparatus according to claim 1, wherein the processor is configured to execute the instructions to output the guide information to the entry control apparatus or a terminal that the visitor has.

3. The visit assistance apparatus according to claim 1, wherein the processor is configured to execute the instructions to:
- determine an allowed visiting time of the visitor based on the guide information for guiding the visitor to the specified seat position of the user to be visited; and
- output an alert when the allowed visiting time has elapsed.

4. The visit assistance apparatus according to claim 3, wherein the processor is configured to execute the instructions to:
- detect the visitor from a surveillance image acquired from a surveillance camera installed in a building by the face authentication using the face image; and
- output the alert when the visitor has been detected.

5. The visit assistance apparatus according to claim 3, wherein the processor sends a notification to a manager terminal as the alert.

6. The visit assistance apparatus according to claim 4, wherein the processor sends a notification regarding a position of the visitor that has been detected along with the alert.

7. The visit assistance apparatus according to claim 4, wherein the processor sends a notification regarding a terminal owned by the visitor as the alert.

8. A visit assistance method performed by a processor and comprising:
- acquiring a face image of a visitor, identification information of the visitor, and identification information of a user to be visited;
- registering the face image of the visitor and visit assistance information in which the identification information of the visitor is associated with the identification information of the user to be visited;
- storing floor information in which identification information of a plurality of users including the user to be visited on a floor and seat positions of the plurality of users are respectively associated with each other;
- registering face feature information based on the face image of the visitor in an authentication apparatus;
- causing face authentication to be performed by comparing the face image of the visitor captured by a camera installed in an entry control apparatus that restricts entry to the floor with the registered face image of the visitor;
- specifying, when the face authentication has been successfully performed, the identification information of the user to be visited based on the visit assistance information;
- specifying the seat position of the user to be visited based on the floor information in which the identification information of the user to be visited is associated with the seat position of the user to be visited;
- releasing, when the face authentication has been successfully performed, restrictions on a gate installed near the entry control apparatus; and
- generating guide information for guiding the visitor to the specified seat position of the user to be visited on the floor, wherein
- the entry control apparatus includes a floor entry control apparatus and a previous-stage entry control apparatus provided in a previous stage of the floor entry control apparatus,
- the processor acquires the face image of the visitor and the identification information of the user to be visited via the previous-stage entry control apparatus,
- the processor transmits an entry permission request including the face image of the visitor and the identification information of the user to be visited to a terminal of the user to be visited on the floor,
- the processor registers, when the entry permission from the terminal of the user to be visited has been received, the visit assistance information and registers the face image in the authentication apparatus, and
- the processor releases, when the entry permission from the terminal of the user to be visited has been received, the restrictions on the gate installed near the previous-stage entry control apparatus.

9. A non-transitory computer readable medium storing a program executable by a processor to perform processing comprising:
- acquiring a face image of a visitor, identification information of the visitor, and identification information of a user to be visited;
- registering the face image of the visitor and visit assistance information in which the identification information of the visitor is associated with the identification information of the user to be visited;
- storing floor information in which identification information of a plurality of users including the user to be visited on a floor and seat positions of the plurality of users are respectively associated with each other;
- registering face feature information based on the face image of the visitor in an authentication apparatus;
- causing face authentication to be performed by comparing the face image of the visitor captured by a camera installed in an entry control apparatus that restricts entry to the floor with the registered face image of the visitor;
- specifying, when the face authentication has been successfully performed, the identification information of the user to be visited based on the visit assistance information;
- specifying the seat position of the user to be visited based on the floor information in which the identification information of the user to be visited is associated with the seat position of the user to be visited;
- releasing, when the face authentication has been successfully performed, restrictions on a gate installed near the entry control apparatus; and
- generating guide information for quiding the visitor to the specified seat position of the user to be visited on the floor, wherein
- the entry control apparatus includes a floor entry control apparatus and a previous-stage entry control apparatus provided in a previous stage of the floor entry control apparatus,
- the processor acquires the face image of the visitor and the identification information of the user to be visited via the previous-stage entry control apparatus,
- the processor transmits an entry permission request including the face image of the visitor and the identification information of the user to be visited to a terminal of the user to be visited on the floor,
- the processor registers, when the entry permission from the terminal of the user to be visited has been received, the visit assistance information and registers the face image in the authentication apparatus, and
- the processor releases, when the entry permission from the terminal of the user to be visited has been received, the restrictions on the gate installed near the previous-stage entry control apparatus.

* * * * *